(12) United States Patent
Ishizaki et al.

(10) Patent No.: US 10,585,507 B2
(45) Date of Patent: Mar. 10, 2020

(54) SENSOR-EQUIPPED DISPLAY DEVICE AND SENSOR DEVICE

(71) Applicant: Japan Display Inc., Tokyo (JP)

(72) Inventors: Koji Ishizaki, Tokyo (JP); Daisuke Sonoda, Tokyo (JP); Tatsuya Ide, Tokyo (JP); Hiroyuki Ito, Tokyo (JP)

(73) Assignee: Japan Display Inc., Tokyo (JP)

( * ) Notice: Subject to any disclaimer, the term of this patent is extended or adjusted under 35 U.S.C. 154(b) by 305 days.

(21) Appl. No.: 15/363,353

(22) Filed: Nov. 29, 2016

(65) Prior Publication Data

US 2017/0153753 A1 Jun. 1, 2017

(30) Foreign Application Priority Data

Nov. 30, 2015 (JP) .................................. 2015-233678

(51) Int. Cl.
*G06F 3/041* (2006.01)
*G02F 1/1333* (2006.01)
(Continued)

(52) U.S. Cl.
CPC ........ *G06F 3/0412* (2013.01); *G02F 1/13338* (2013.01); *G06F 3/044* (2013.01);
(Continued)

(58) Field of Classification Search
CPC .................. G06F 3/0412; G06F 3/044; G06F 2203/04103; G06F 2203/04111;
(Continued)

(56) References Cited

U.S. PATENT DOCUMENTS

2004/0104900 A1\* 6/2004 Bang ..................... G06F 3/0412
345/173
2010/0097346 A1\* 4/2010 Sleeman ............... G06F 3/0412
345/174
(Continued)

FOREIGN PATENT DOCUMENTS

JP 2012-079238 4/2012
JP 2013-540331 10/2013
(Continued)

OTHER PUBLICATIONS

Japanese Office Action dated Apr. 2, 2019 in corresponding Japanese Application No. 20115-233678.
(Continued)

*Primary Examiner* — Sejoon Ahn
(74) *Attorney, Agent, or Firm* — K&L Gates LLP

(57) ABSTRACT

According to one embodiment, a sensor-equipped display device includes a display panel including a sensor drive electrode and a detection electrode opposed to the sensor drive electrode and a driver, wherein the detection electrode includes a first layer formed in a thin line shape, and a second layer on the first layer in a plan view of the display area, the second layer having a reflectivity lower than that of the first layer, the outer edge of a second lower surface of the second layer is shifted with respect to the outer edge of a first upper surface of the first layer in a plan view, and the outermost outer edge of the second layer is positioned outside the outermost outer edge of the first layer in a plan view.

20 Claims, 17 Drawing Sheets

(51) Int. Cl.
*G06F 3/044* (2006.01)
*G02F 1/1343* (2006.01)

(52) U.S. Cl.
CPC .............. *G02F 1/13439* (2013.01); *G06F 2203/04103* (2013.01); *G06F 2203/04111* (2013.01); *G06F 2203/04112* (2013.01)

(58) Field of Classification Search
CPC ....... G06F 2203/04112; G02F 1/13338; G02F 1/13439
See application file for complete search history.

(56) References Cited

U.S. PATENT DOCUMENTS

| | | | | |
|---|---|---|---|---|
| 2010/0171718 A1* | 7/2010 | Denda | ............... | G06F 3/044 345/173 |
| 2011/0032193 A1* | 2/2011 | Szalkowski | ............ | G06F 3/044 345/173 |
| 2011/0050636 A1* | 3/2011 | Nagata | ............... | G06F 3/044 345/174 |
| 2011/0169767 A1* | 7/2011 | Weindorf | ............ | G02F 1/13338 345/174 |
| 2014/0333855 A1* | 11/2014 | Park | ............... | G06F 3/041 349/12 |
| 2015/0177876 A1 | 6/2015 | Ishii et al. | | |
| 2015/0242011 A1* | 8/2015 | Yeh | ............... | B32B 15/04 345/174 |
| 2015/0253810 A1 | 9/2015 | Shin et al. | | |

FOREIGN PATENT DOCUMENTS

| | | |
|---|---|---|
| JP | 2013-238794 | 11/2013 |
| JP | 2014-016944 | 1/2014 |
| JP | 2014-021522 | 2/2014 |
| JP | 2015-0177876 | 6/2015 |
| JP | 2015-194996 | 11/2015 |

OTHER PUBLICATIONS

Japanese Office Action dated Sep. 17, 2019 in corresponding Japanese Application No. 2015-233678.

* cited by examiner

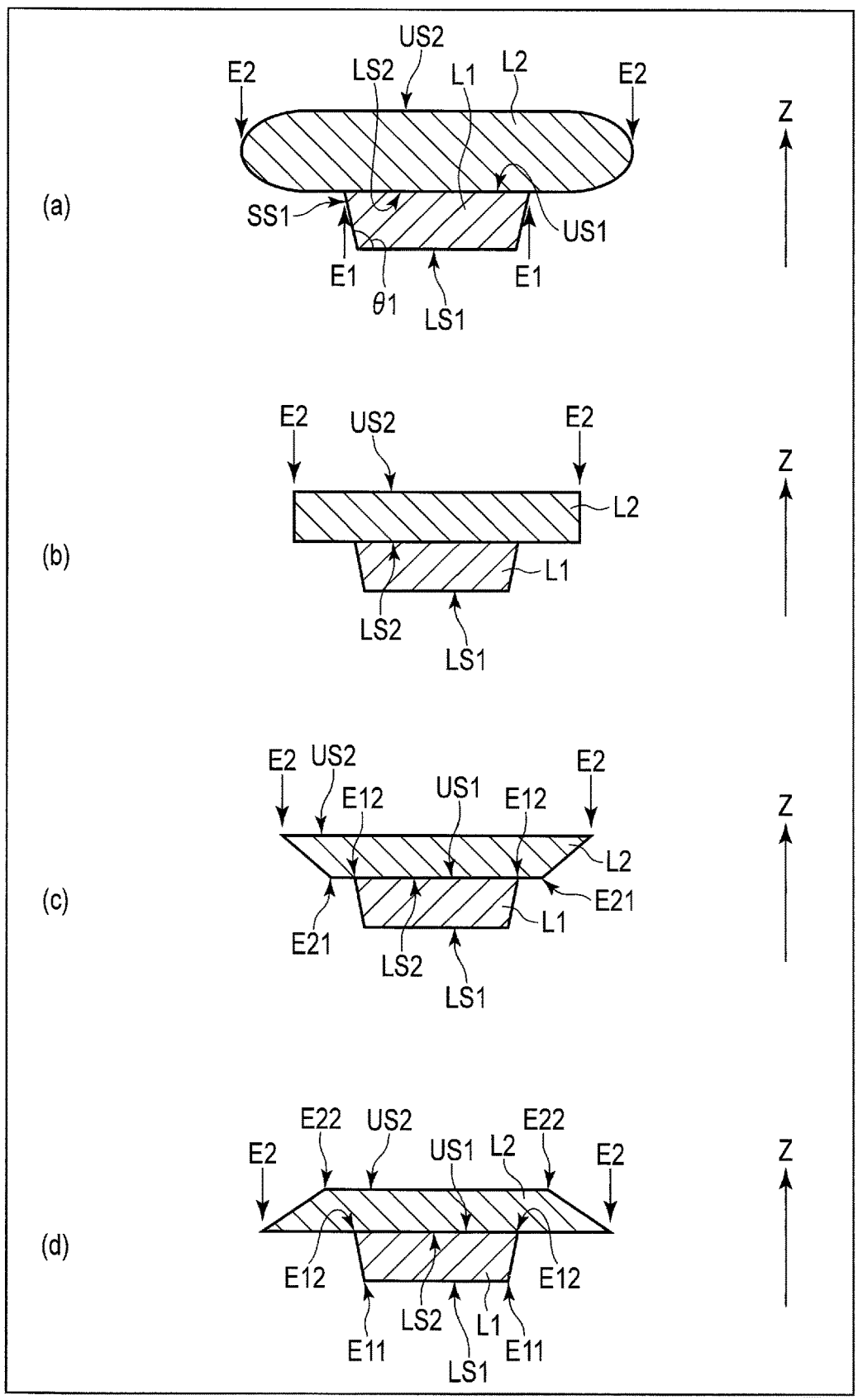
F I G. 6

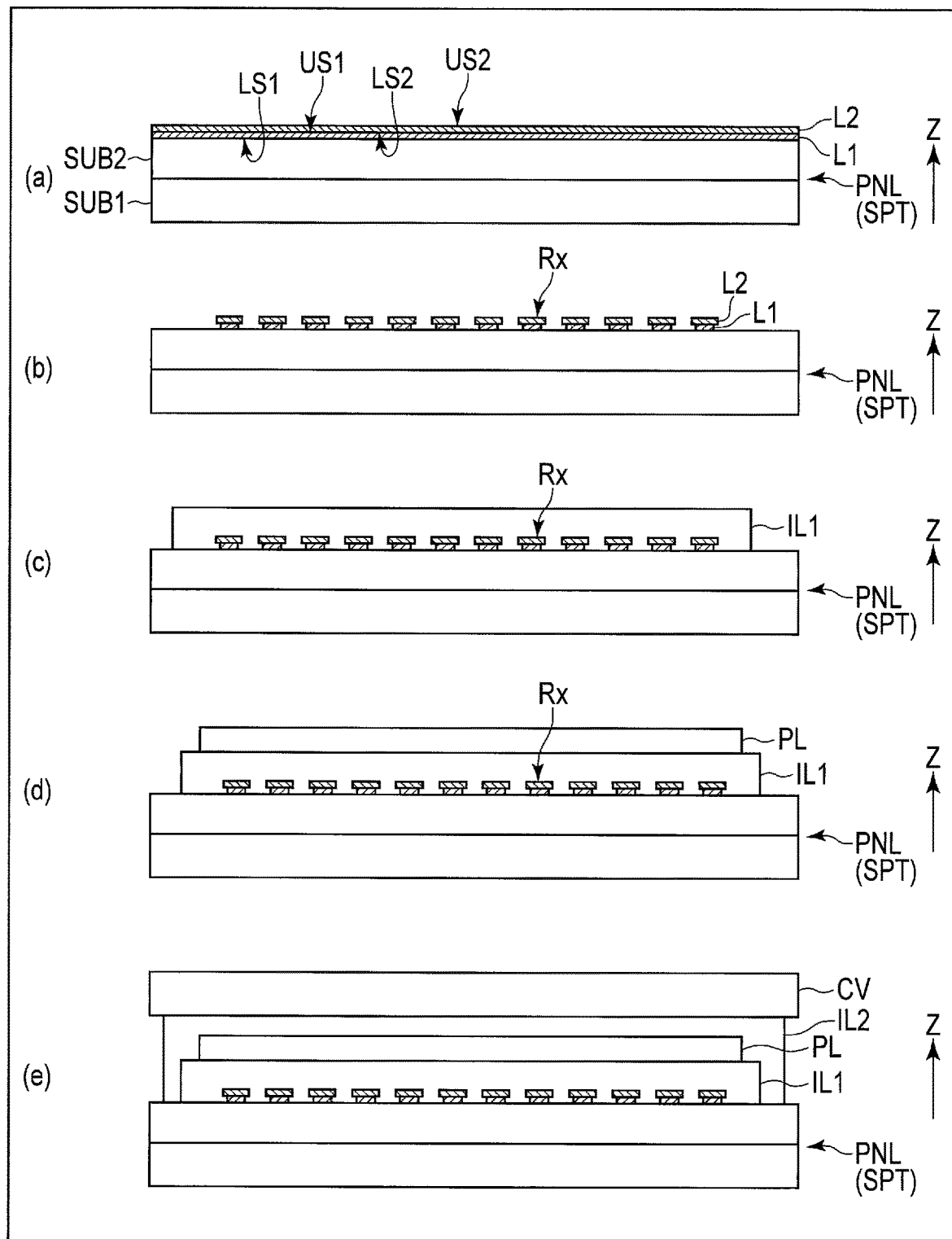
F I G. 11

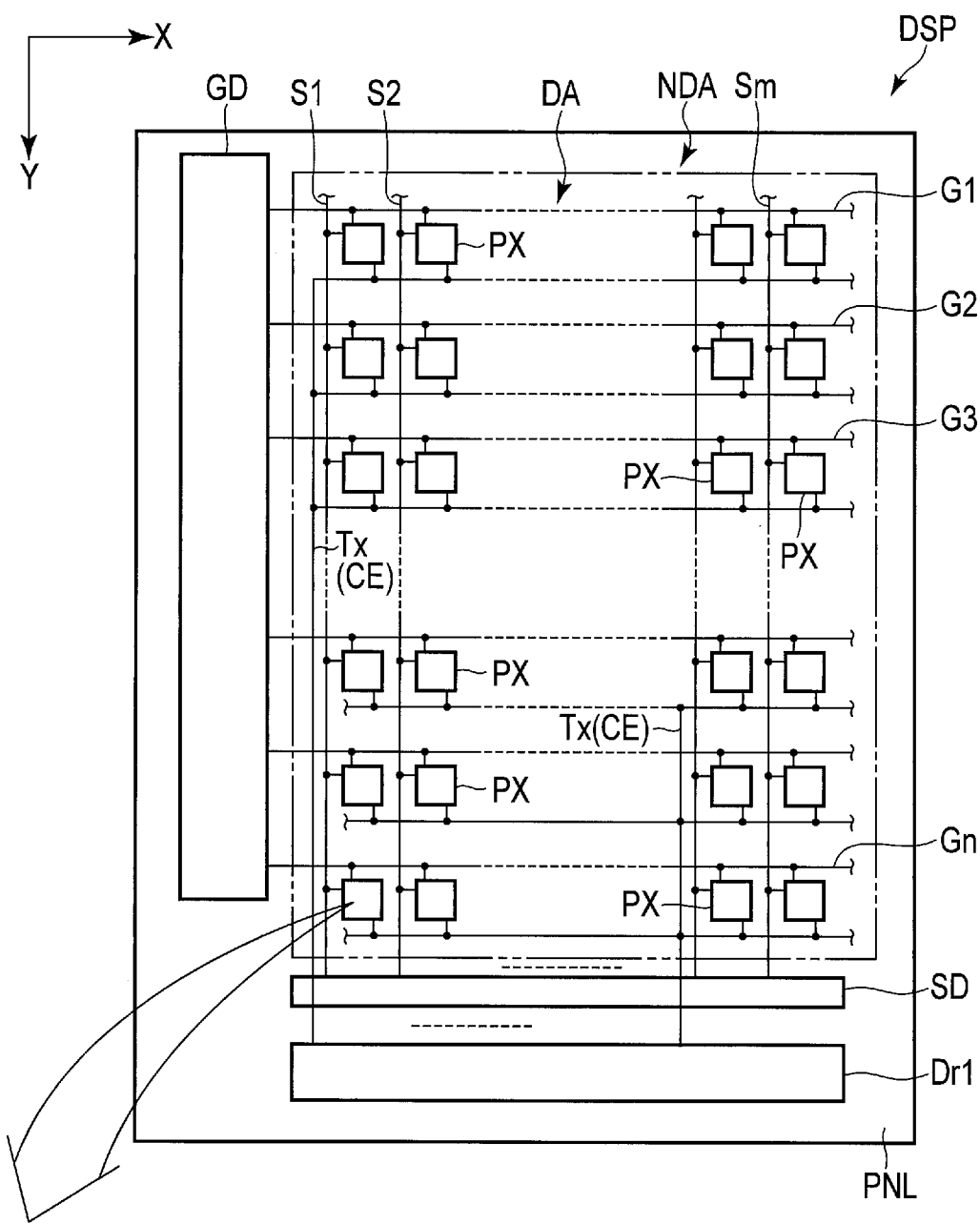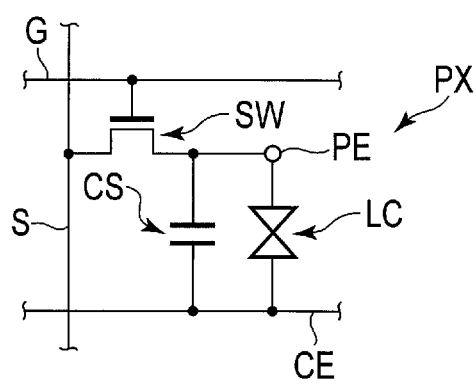
FIG. 13

SENSOR-EQUIPPED DISPLAY DEVICE AND SENSOR DEVICE

CROSS-REFERENCE TO RELATED APPLICATIONS

This application is based upon and claims the benefit of priority from Japanese Patent Application No. 2015-233678, filed Nov. 30, 2015, the entire contents of which are incorporated herein by reference.

FIELD

Embodiments described herein relate generally to a sensor-equipped display device and a sensor device.

BACKGROUND

In recent years, sensor-equipped display devices configured to detect an object approaching or contacting thereon by a sensor (or a touchpanel) are used. Such a sensor may be formed as a thin conductive mesh in which detection electrodes are formed for the positional detection, and the sensor includes a metal layer and a black layer disposed on the metal layer.

If the detection electrodes include a metal layer, the detection electrodes emit light at their edges because the light is reflected by the side surfaces of the metal layer. Therefore, in a combination of such a sensor and a display device, the display quality of an image displayed on the display device may be deteriorated.

SUMMARY

The present application generally relates to a sensor-equipped display device and a sensor device.

In an embodiment, a sensor-equipped display device is provided. The sensor-equipped display device includes a display panel including a sensor drive electrode disposed in a display area and a detection electrode opposed to the sensor drive electrode in the display area; and a driver which supplies a sensor drive signal to the sensor drive electrode and reads a change in a detection signal, the sensor drive signal from the sensor drive electrode to be detected as the detection signal by the detection electrode, wherein the detection electrode includes a first layer formed in a thin line shape, and a second layer on the first layer in a plan view of the display area, the second layer having a reflectivity lower than that of the first layer, the first layer includes a first lower surface, a first upper surface above the first lower surface, and a first side surface, the second layer includes a second lower surface on the first upper surface, and a second upper surface above the second lower surface, the outer edge of the second lower surface is shifted with respect to the outer edge of the first upper surface in a plan view, and the outermost outer edge of the second layer is positioned outside the outermost outer edge of the first layer in a plan view.

In an embodiment, a sensor device is provided. The sensor device includes a substrate and a detection electrode provided with the substrate, wherein the detection electrode includes a first layer formed in a thin line shape, and a second layer on the first layer in a plan view of the sensor device, the second layer having a reflectivity lower than that of the first layer, the first layer includes a first lower surface, a first upper surface above the first lower surface, and a first side surface, the second layer includes a second lower surface contacting the first upper surface, and a second upper surface above the second lower surface, the outer edge of the second lower surface is shifted with respect to the outer edge of the first upper surface in a plan view, and the outermost outer edge of the second layer is outside the outermost outer edge of the first layer in a plan view.

Additional features and advantages are described herein, and will be apparent from the following Detailed Description and the figures.

BRIEF DESCRIPTION OF THE DRAWINGS

FIG. 6 is a cross-sectional view of another example of the detection electrode Rx, taken along line A-B of FIG. 3.

FIG. 11 is a cross-sectional view showing a manufacturing method of a display device including the sensor SE.

FIG. 13 shows the basic structure of the display device DSP of FIG. 1 and its equivalent circuit.

DETAILED DESCRIPTION

Figure 1:
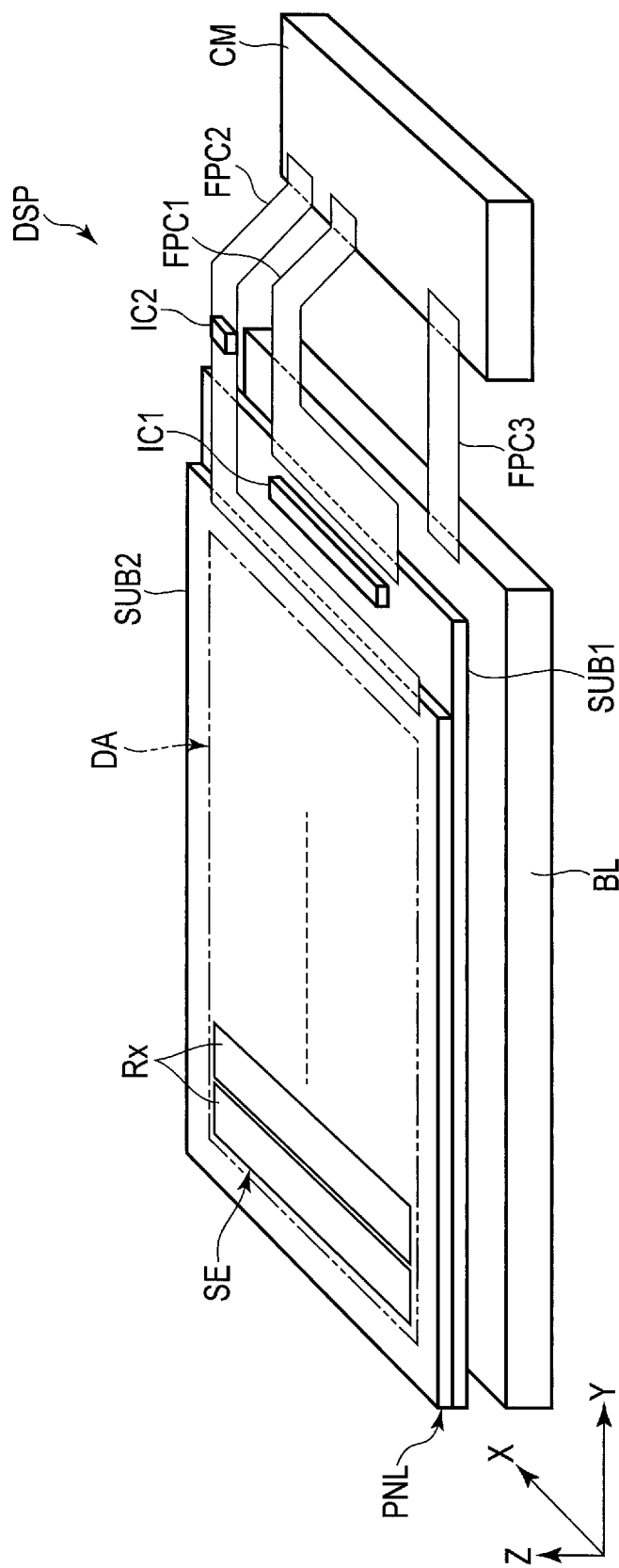
FIG. 1 is a perspective view showing an example of the structure of a sensor-equipped display device of an embodiment.

In general, according to one embodiment, a sensor-equipped display device comprising: a display panel including a sensor drive electrode disposed in a display area and a detection electrode opposed to the sensor drive electrode in the display area; and a driver which supplies a sensor drive signal to the sensor drive electrode, and reads a change in the detection signal, the sensor drive signal from the sensor drive electrode to be detected as the detection signal by the detection electrode, wherein the detection electrode includes a first layer formed in a thin line shape, and a second layer on the first layer in a plan view of the display area, the second layer having a reflectivity lower than that of the first layer, the first layer includes a first lower surface, a first upper surface above the first lower surface, and a first side surface, the second layer includes a second lower surface contacting the first upper surface, and a second upper surface above the second lower surface, the outer edge of the second lower surface is shifted with respect to the outer edge of the first upper surface in a plan view, and the outermost outer edge of the second layer is positioned outside the outermost outer edge of the first layer in a plan view.

According to one embodiment, a sensor device includes: a substrate and a detection electrode provided with the substrate, wherein: the detection electrode includes a first layer formed in a thin line shape, and a second layer on the first layer in a plan view of the sensor device, the second layer having a reflectivity lower than that of the first layer; the first layer includes a first lower surface, a first upper surface above the first lower surface, and a first side surface; the second layer includes a second lower surface contacting the first upper surface, and a second upper surface above the second lower surface; the outer edge of the second lower surface is shifted with respect to the outer edge of the first upper surface; and the outermost outer edge of the second layer is positioned outside the outermost outer edge of the first layer.

According to one embodiment, a sensor-equipped display device includes: a display panel including a sensor drive electrode disposed in a display area and a detection electrode opposed to the sensor drive electrode in the display area; and a driver which supplies a sensor drive signal to the sensor drive electrode, and reads a change in the detection signal, the sensor drive signal from the sensor drive electrode to be detected as the detection signal by the detection electrode, wherein: the detection electrode includes a first layer formed in a thin line shape, and a second layer on the first layer in a plan view of the display area, the second layer having a reflectivity lower than that of the first layer; the first layer includes a first lower surface, a first upper surface above the first lower surface, and a first side surface; the first lower surface and the first side surface form an angle of 90° or less; the second layer includes a second lower surface contacting the first upper surface, and a second upper surface above the second lower surface; the outer edge of the second lower surface is shifted with respect to the outer edge of the first upper surface; and the outermost outer edge of the second layer is positioned outside the outermost outer edge of the first layer.

According to one embodiment, a sensor-equipped display device includes: a display panel including a sensor drive electrode disposed in a display area and a detection electrode opposed to the sensor drive electrode in the display area; and a driver which supplies a sensor drive signal to the sensor drive electrode, and reads a change in the detection signal, the sensor drive signal from the sensor drive electrode to be detected as the detection signal by the detection electrode, wherein: the detection electrode includes a first layer formed in a thin line shape, and a second layer on the first layer in a plan view of the display area, the second layer having a reflectivity lower than that of the first layer; the first layer includes a first lower surface, a first upper surface above the first lower surface, and a first side surface; the first lower surface and the first side surface form an obtuse angle; the second layer includes a second lower surface contacting the first upper surface, and a second upper surface above the second lower surface; the outer edge of the second lower surface is shifted with respect to the outer edge of the first upper surface; and the outermost outer edge of the second layer is positioned outside the outermost outer edge of the first layer.

According to one embodiment, a sensor-equipped display device includes: a display panel including a sensor drive electrode disposed in a display area and a detection electrode opposed to the sensor drive electrode in the display area; and a driver which supplies a sensor drive signal to the sensor drive electrode, and reads a change in the detection signal, the sensor drive signal from the sensor drive electrode to be detected as the detection signal by the detection electrode, wherein: the detection electrode includes a first layer formed in a thin line shape, and a second layer on the first layer in a plan view of the display area, the second layer having a reflectivity lower than that of the first layer; the first layer includes a first lower surface, a first upper surface above the first lower surface, and a first side surface; the first lower surface and the first side surface form a first angle which is obtuse; the second layer includes a second lower surface contacting the first upper surface, a second upper surface above the second lower surface, and a second side surface; the second lower surface and the second side surface form a second angle which is obtuse; the first angle is different form the second angle; the outer edge of the second lower surface overlaps with the outer edge of the first upper surface; and the outermost outer edge of the second layer is positioned outside the outermost outer edge of the first layer.

According to one embodiment, a sensor-equipped display device includes: a display panel including a sensor drive electrode disposed in a display area and a detection electrode opposed to the sensor drive electrode in the display area; and a driver which supplies a sensor drive signal to the sensor drive electrode, and reads a change in the detection signal, the sensor drive signal from the sensor drive electrode to be detected as the detection signal by the detection electrode, wherein: the detection electrode includes a first layer and a second layer; the first layer includes a first lower surface, a first upper surface above the first lower surface in a plan view of the display area, and a first side surface; and the second layer covers the first upper surface and the first side surface.

According to one embodiment, a sensor device includes: a substrate and a detection electrode provided with the substrate, wherein: the detection electrode includes a first layer formed in a thin line shape, and a second layer on the first layer in a plan view of the sensor device, the second layer having a reflectivity lower than that of the first layer; the first layer includes a first lower surface, a first upper surface above the first lower surface, and a first side surface; the first lower surface and the first side surface form an obtuse angle; the second layer includes a second lower surface contacting the first upper surface, and a second upper surface above the second lower surface; and the outermost outer edge of the second layer is positioned outside the outermost outer edge of the first layer.

According to one embodiment, a sensor device includes: a substrate and a detection electrode provided with the substrate, wherein: the detection electrode includes a first layer formed in a thin line shape, and a second layer on the first layer in a plan view of the sensor device, the second layer having a reflectivity lower than that of the first layer; the first layer includes a first lower surface, a first upper surface above the first lower surface, and a first side surface; the first lower surface and the first side surface form an obtuse angle; the second layer includes a second lower surface contacting the first upper surface, and a second upper surface above the second lower surface; the outer edge of the second lower surface is shifted with respect to the outer edge of the first upper surface; and the outermost outer edge of the second layer is positioned outside the outermost outer edge of the first layer.

According to one embodiment, a sensor device includes: a substrate and a detection electrode provided with the substrate, wherein: the detection electrode includes a first layer formed in a thin line shape, and a second layer on the first layer in a plan view of the sensor device, the second layer having a reflectivity lower than that of the first layer; the first layer includes a first lower surface, a first upper surface above the first lower surface, and a first side surface; the first lower surface and the first side surface form a first angle which is obtuse; the second layer includes a second lower surface contacting the first upper surface, and a second upper surface above the second lower surface, and a second side surface; the second lower surface and the second side surface form a second angle which is obtuse; the first angle is different from the second angle; the outer edge of the second lower surface overlaps with the outer edge of the first upper surface; and the outermost outer edge of the second layer is positioned outside the outermost outer edge of the first layer.

According to one embodiment, a sensor device includes: a substrate and a detection electrode provided with the substrate, wherein: the detection electrode includes a first layer and a second layer; the first layer includes a first lower surface, a first upper surface above the first lower surface in a plan view of the sensor device, and a first side surface; and the second layer covers the first upper surface and the first side surface.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc. of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless necessary.

FIG. 1 is a perspective view showing an example of the structure of a sensor-equipped display device of a present embodiment. In the figure, a first direction X and a second direction Y cross each other. In this example, the first direction X and the second direction Y are orthogonal to each other; however, in some cases the first direction X and the second direction Y may simply cross each other. A third direction Z is orthogonal to both the first direction X and the second direction Y. In the present application, a direction going toward the tip of the arrow of the third direction Z will be defined as above (or up) and its opposite direction will be defined as below (or down). Furthermore, an observation point from which a display device DSP is observed is given in the tip side of the arrow of the third direction Z, and a view from the observation point to an X-Y plane defined by the first direction X and the second direction Y will be defined as a plan view.

In the present embodiment, a liquid crystal display device is exemplified as the sensor-equipped display device. The display device DSP includes a display panel PNL, driver IC chip IC1 which drives the display panel PNL, capacitance sensor SE, driver IC chip IC2 which drives the sensor SE, backlight unit BL which illuminates the display panel PNL, control module CM, an flexible printed circuits FPC1, FPC2, and FPC3.

The display panel PNL includes a flat first substrate SUB1, flat second substrate SUB2 disposed to be opposed to the first substrate SUB1, and liquid crystal layer (liquid crystal layer LC which will be described later) disposed between the first substrate SUB1 and the second substrate SUB2. The display panel PNL includes a display area DA in which an image is displayed. In the example depicted, the display panel PNL is of transmissive type which displays an image by selectively passing light from the backlight unit BL. Note that the display panel PNL may be of reflective type which displays an image by selectively reflecting external light and auxiliary light from the second substrate SUB2 side. Or, the display panel PNL may be of transflective type which is a combination of the transmissive type and the reflective type.

The backlight unit BL is disposed in the rear surface side of the first substrate SUB1.

The sensor SE includes a plurality of detection electrodes Rx. The detection electrodes Rx are, for example, disposed on the display surface of the display panel PNL, that is, on the outer surface of the second substrate SUB2. In this example, the detection electrodes Rx are depicted schematically. In the example depicted, the detection electrodes Rx extend in the first direction X and are arranged in the second direction Y. Note that the detection electrodes Rx may extend in the second direction Y and are arranged in the first direction X, or they may be formed in a matrix extending both the first direction X and the second direction Y in islands.

The driver IC chip IC1 is mounted on the first substrate SUB1. The flexible printed circuit FPC1 connects the display panel PNL and the control module CM. The flexible printed circuit FPC2 connects the detection electrodes Rx and the control module CM. The driver IC chip IC2 is mounted on the flexible printed circuit FPC2. Note that the driver IC chip IC2 may be mounted on the first substrate SUB1 or may be mounted on the control module CM. The flexible printed circuit FPC3 connected the backlight unit BL and the control module CM.

Either the driver IC chip IC1 or the driver IC chip IC2 generates timing signals used for notification of a drive time of the sensor SE or timing signals used for notification of a drive time of a common electrode CE which will be described later, and supplies the timing signals to the other driver IC chip. Or, the control module CM supplies timing signals to the driver IC chips IC1 and IC2. The timing signals are used to synchronize the drive of the driver IC chip IC1 and the driver IC chip IC2.

Figure 2:
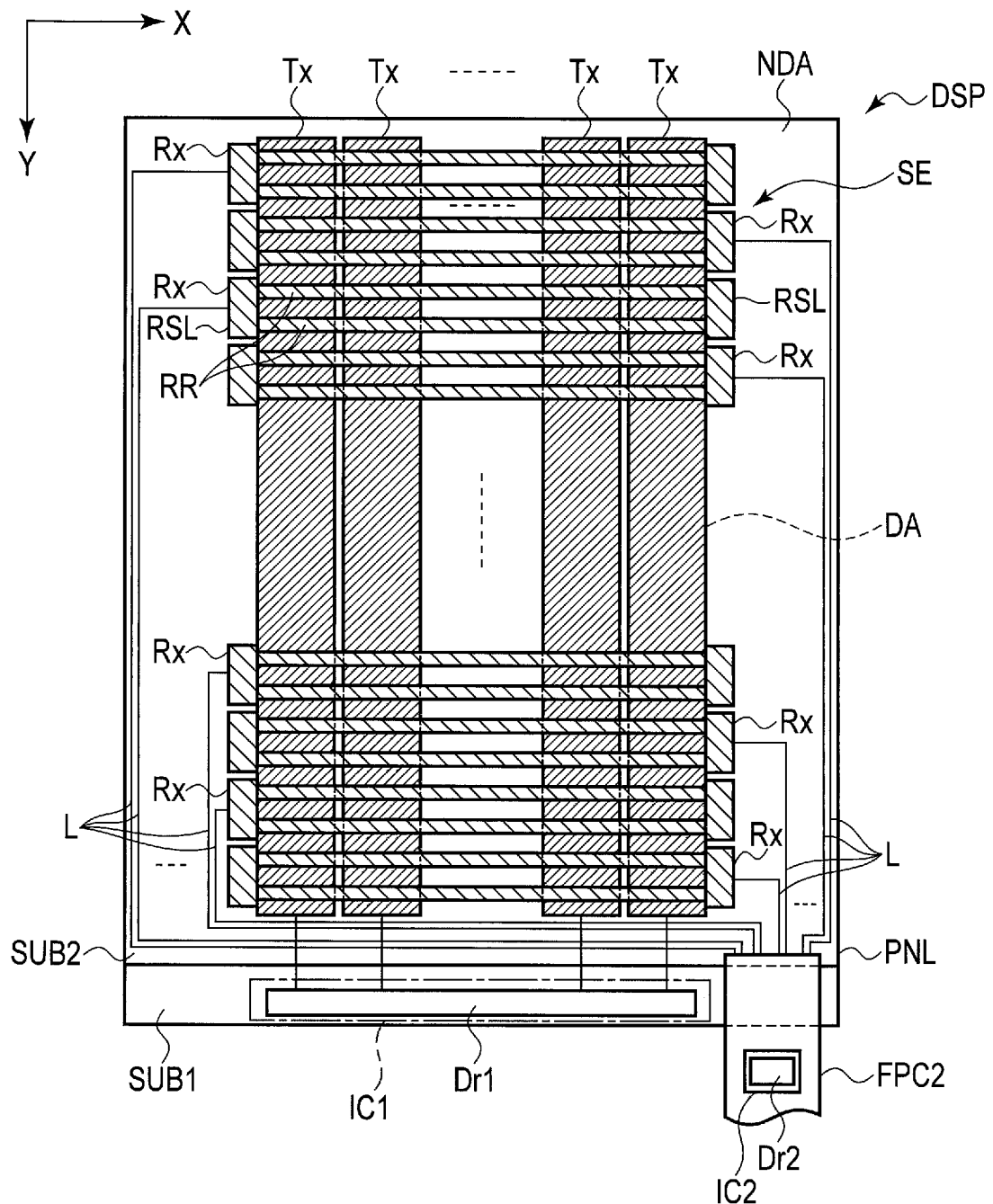
FIG. 2 is a plan view of an example of the structure of a sensor SE of FIG. 1.

FIG. 2 is a plan view of an example of the structure of the sensor SE of FIG. 1. In the present embodiment, the sensor SE includes sensor drive electrodes Tx and detection electrodes Rx. In this example, the first substrate SUB1 includes the sensor drive electrodes Tx and the second substrate SUB2 includes the detection electrodes Rx. The sensor drive electrodes Tx and the detection electrodes Rx are opposed to each other with some dielectrics interposed therebetween.

The sensor drive electrodes Tx are disposed in the display area DA. In the example depicted, the sensor drive electrodes Tx are formed in bands extending in the second direction Y and are arranged in the first direction X in the display area DA at intervals.

The sensor drive electrodes Tx are each electrically connected to a first drive circuit Dr1 in a non-display area NDA. In this example, the first drive circuit Dr1 is stored in the driver IC chip IC1. Alternatively, the first drive circuit Dr1 may be disposed outside the driver IC chip IC1. The first drive circuit Dr1 functions as a driver which supplies sensor drive signals during a sensing drive operation in which sensing is performed.

The detection electrode Rx includes widened parts RSL and main parts RR. The widened parts RSL are disposed in the non-display area NDA to be arranged in the second direction Y. The main parts RR are disposed in the display area DA to be arranged in the second direction Y. Each main part RR extends in the first direction X. That is, the main parts RR extend in a direction crossing the sensor drive electrodes Tx. Note that the main parts RR are roughly depicted in bands in the figure; however, as described later, each main part RR is formed of aggregated micro metal lines. Furthermore, the widened parts RSL are roughly depicted in quadrangles in the figure; however, as described later, each widened part RSL is formed of aggregated micro metal lines.

Lead lines L are electrically connected to the detection electrodes Rx one-by-one and are disposed in the same surface where the detection electrodes Rx are disposed. The lead lines L are positioned in the non-display area NDA in the second substrate SUB2. The lead lines L output sensor output values from the detection electrodes Rx.

The detection electrodes Rx are each electrically connected to a second drive circuit Dr2 through corresponding lead lines L. In this example, the second drive circuit Dr2 is stored in the driver IC chip IC2; however, no limitation is intended thereby, and the second drive circuit Dr2 may be disposed outside the driver IC chip IC2. In the example depicted, the flexible printed circuit FPC2 is connected to the second substrate SUB2 in the non-display area NDA and is electrically connected to each lead line L. The driver IC chip IC2 storing the second driver circuit Dr2 is mounted on the flexible printed circuit FPC2. The lead lines L are each electrically connected to the second drive circuit Dr2 through the lines of the flexible printed circuit FPC2. The second drive circuit Dr2 functions as a read driver which, in the sensing drive, detects sensor drive signals from the sensor drive electrodes Tx by the detection electrodes Rx as detection signals and reads a change in the detection signals as sensor output values through the lead lines L. The second drive circuit Dr2 with the above function detects a contact or approach of an object with respect to the display device DSP on the basis of the sensor output values from the detection electrodes Rx. Furthermore, the second drive circuit Dr2 can detect positional data of the position where the object contacts or approaches.

Note that the number, size, and shape of the sensor drive electrodes Tx and the detection electrodes Rx are not limited to those of the example depicted, and they may be changed arbitrarily.

Figure 3:
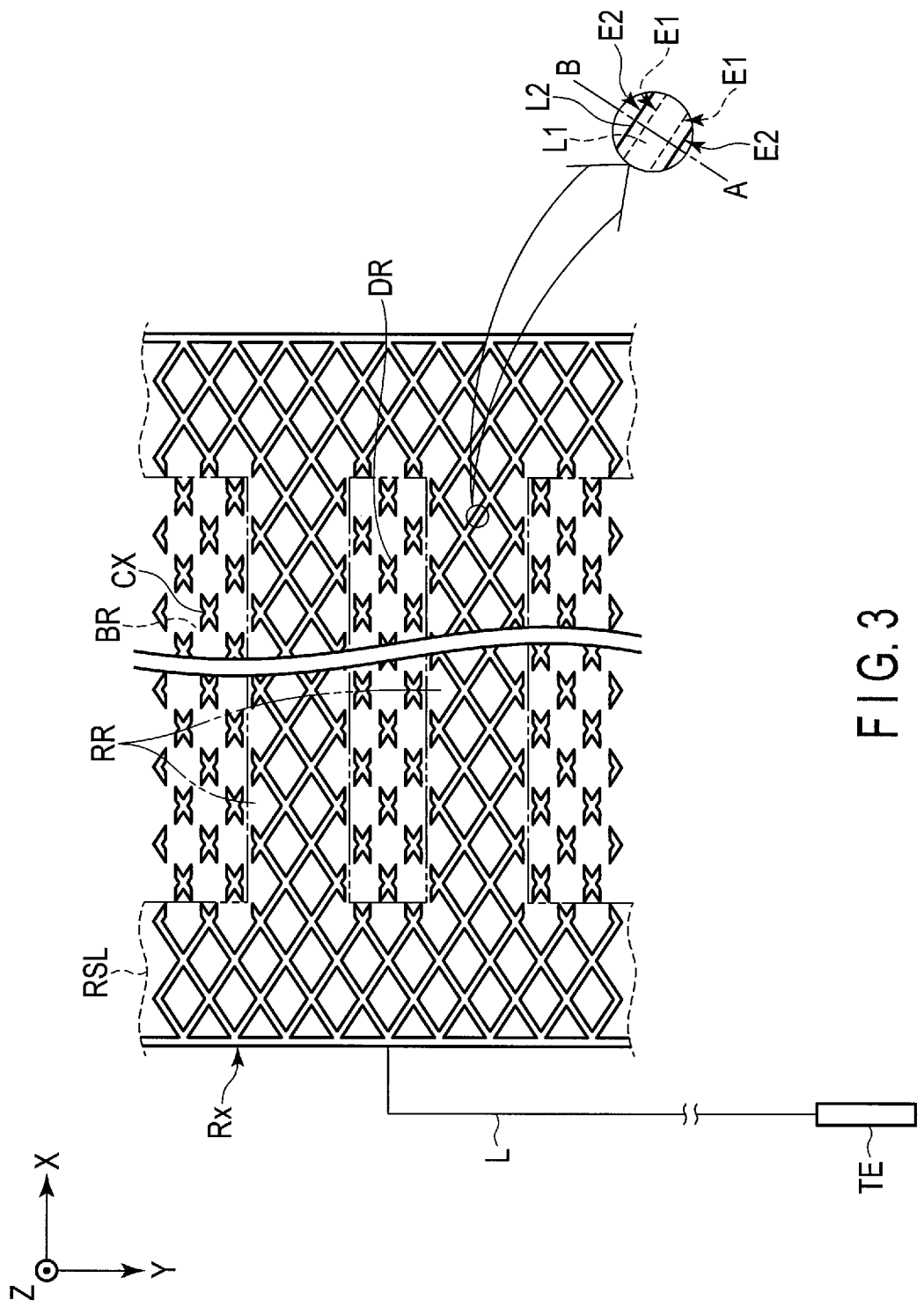
FIG. 3 is a plan view of an example of the structure of a detection electrode Rx of FIG. 2.

FIG. 3 is a plan view of an example of the structure of the detection electrode Rx of FIG. 2.

The lead lines L are connected to the detection electrodes Rx at one end and to terminals TE at the other end. The terminals TE are electrically connected to the flexible printed circuit FPC2 of FIG. 2.

The detection electrode Rx is formed of a metal in at least its main parts, and is formed as aggregated thin lines. In the example depicted, the widened parts RSL and the main parts RR of the detection electrode Rx are formed in a mesh shape. However, the widened parts RSL and the main parts RR of the detection electrode Rx may be formed in a linear wave shape (or triangular wave shape) or in a circular wave shape such as sine wave, or may be formed in a combination of such shapes.

Dummy electrodes DR are disposed between the main parts RR. In the example depicted, the dummy electrodes DR are formed of in a mesh shape with thin metal lines as in the main parts RR. In the dummy electrodes DR, thin metal lines are formed discontinuously. For example, a break BR is provided between crossing points CX of crossing thin metal lines. Note that the position of the break BR is not limited to the example depicted, and it may be provided with the crossing point CX. The dummy electrodes are not connected to the detection electrodes Rx or the lead lines L and are electrically floating. A gap between the thin lines is set to, preferably, 50 to 200 μm, or more preferably, approximately 100 μm.

The detection electrode Rx is, as depicted in an enlarged manner, a layered structure which includes at least two layers. That is, the detection electrode Rx include, in a plan view, a first layer L1 which is a lower layer and a second layer L2 which is positioned above the first layer L1. As described later, the second layer L2 is formed wider than the first layer L1 and the outermost outer edge E2 of the second layer L2 is positioned outside the outermost outer edge E1 of the first layer L1.

In the figure, the dummy electrode DR, lead line L, and terminal TE are formed as a layered structure as the detection electrode Rx.

Figure 4:
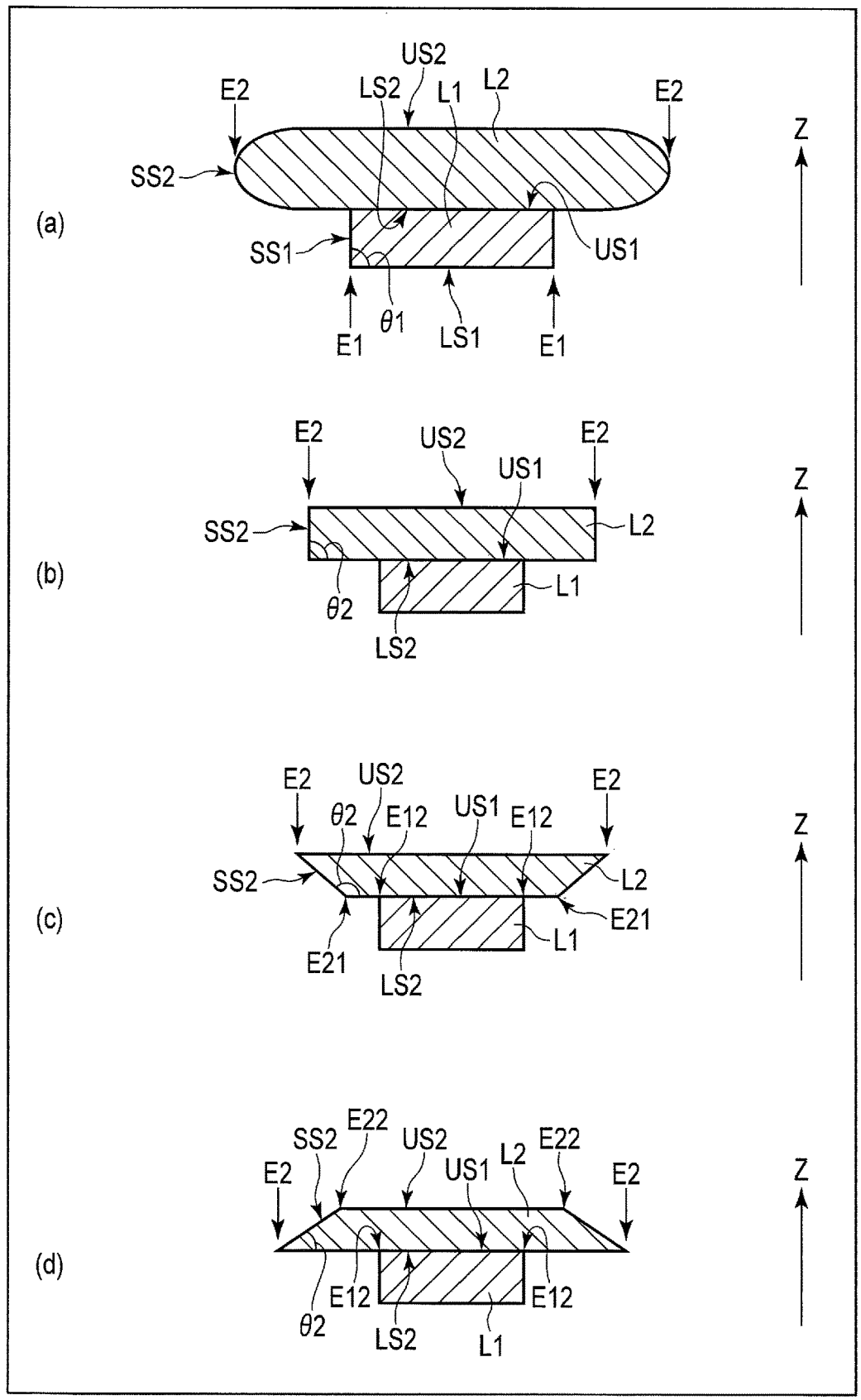
FIG. 4 is a cross-sectional view of an example of the detection electrode Rx, taken along line A-B of FIG. 3.

FIG. 4 is a cross-sectional view of the detection electrode Rx of FIG. 3, taken along line A-B of FIG. 3. In the example depicted, a first lower surface LS1 and a first side surface SS1 of the first layer L1 form an angle θ1 which is 90 degrees. In this example, viewing from the opposite side of the tip side of the arrow of the third direction Z to the tip side of the arrow of the third direction Z is referred to as a plan view.

As in FIG. 4(a), the first layer L1 includes a first lower surface LS1, first upper surface US1 which is positioned above the first lower surface LS1, and first side surface SS1. In the example depicted, the cross-section of the first layer L1 is a rectangle; however, it may be a square. In a plan view of the first layer L1, the outer edge of the first lower surface LS1 matches the outer edge of the first upper surface US1. That is, the outermost outer edge E1 of the first layer L1 corresponds to the outer edge of either the first lower surface LS1 or the first upper surface US1.

The second layer L2 includes a second lower surface LS2 contacting the first upper surface US1, second upper surface US2 which is positioned above the second lower surface LS2, and second side surface SS2. The position of the outermost outer edge E2 in the second layer L2 is not detailed here; however, it may be disposed on the second lower surface LS2, or on the second upper surface US2, or between the second lower surface LS2 and the second upper surface US2. In either case, the outermost outer edge E2 is positioned outside the outermost outer edge E1 in the detection electrode in which the first layer L1 having a rectangular cross-section and the second layer L2 are layered.

The first layer L1 is a conductive layer of low resistance and is a main structure of the detection electrode Rx. The second layer L2 is a reflection suppressive layer which suppresses the reflection on the first layer L1. The second layer L2 has a reflectivity which is significantly lower than that of the first layer L1, and thus, the surface color of the second layer L2 is recognized as black. In this example, the reflectivity of the first layer L1 is approximately 50% or more and the reflectivity of the second layer L2 is approximately 10% or less. In consideration of the function of the reflection suppressive layer, the reflectivity of the second layer L2 should be set as close to 0% as possible.

In this example, each of the first layer L1 and the second layer L2 is a conductive layer. The electrical resistance of the first layer L1 is lower than that of the second layer L2. The second layer L2 may be formed as layered metal films of different refractive indices, or as a color resin film.

FIG. 4(b), FIG. 4(c), and FIG. 4(d) show specific cross-sectional shapes of the second layer L2 of FIG. 4(a).

FIG. 4(b) shows a case where the second layer L2 has a rectangular cross-section. That is, the second layer L2 has a second lower surface LS2, second upper surface US2, and second side surface SS2. The second lower surface LS2 contacts the first upper surface US1 and extends over the edges of the first upper surface US1. The second lower surface LS2 and the second side surface SS2 form an angle θ2 which is 90 degrees. In a plan view of the second layer L2, the outer edge of the second lower surface LS2 corresponds to the outer edge of the second upper surface US2. That is, in the example depicted, the outermost outer edge E2 of the second layer L2 corresponds to the outer edge of either the second lower surface LS2 or the second upper surface US2.

FIG. 4(c) shows a case where the second layer L2 has an inversely tapered cross-section which widens from the second lower surface LS2 to the second upper surface US2. The second lower surface LS2 and the second side surface SS2 form an angle θ2 which is an obtuse angle. In a plan view of the second layer L2, the outer edge of the second upper surface US2 is positioned outside the outer edge of the second lower surface LS2. That is, in the example depicted, the outermost outer edge E2 of the second layer L2 corresponds to the outer edge of the second upper surface US2. Note that, in the example depicted, the outer edge E21 of the second lower surface LS2 is positioned outside the outer edge E12 of the first upper surface US1; however, the outer edge E21 may be positioned inside the outer edge E12, or may match the outer edge E12.

FIG. 4(d) shows a case where the second layer L2 has an orderly tapered cross-section which narrows from the second lower surface LS2 to the second upper surface US2. The second lower surface LS2 and the second side surface SS2 form an angle θ2 which is an acute angle. In a plan view of the second layer L2, the outer edge of the second lower surface LS2 is positioned outside the outer edge of the second upper surface US2. That is, in the example depicted, the outermost outer edge E2 of the second layer L2 corresponds to the outer edge of the second lower surface LS2. Note that, in the example depicted, the outer edge E22 of the second upper surface US2 is positioned outside the outer edge E12 of the first upper surface US1; however, the outer edge E22 may be positioned inside the outer edge E12, or may match the outer edge E12.

Figure 5:
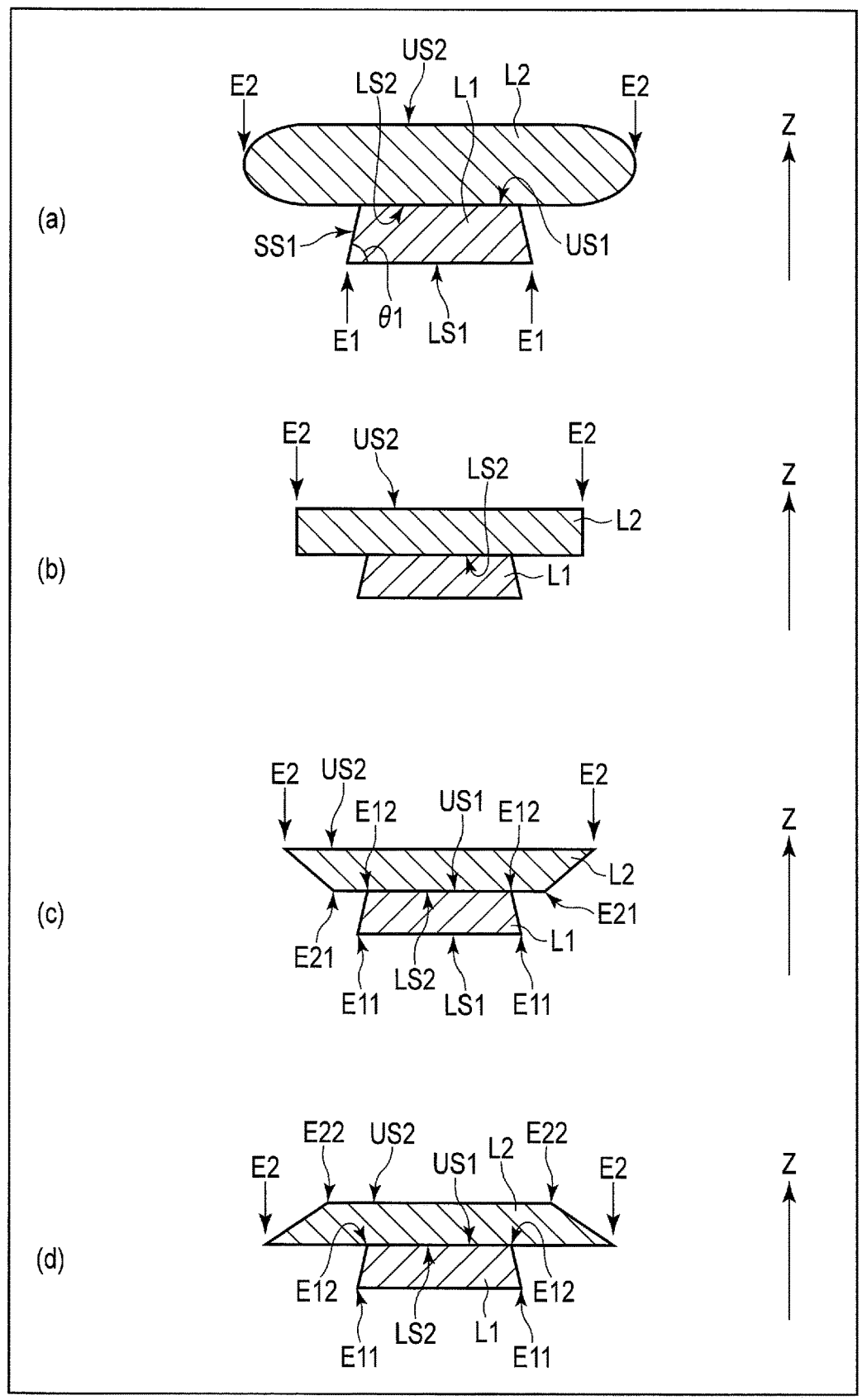
FIG. 5 is a cross-sectional view of another example of the detection electrode Rx, taken along line A-B of FIG. 3.

FIG. 5 is a cross-sectional view of another example of the detection electrode Rx, taken along line A-B of FIG. 3. In the example depicted, the first lower surface LS1 and the first side surface SS1 form an angle θ1 which is an acute angle.

As shown in FIG. 5(a), the first layer L1 has an orderly tapered cross-sectional view which narrows from the first lower surface LS1 to the first upper surface US1. In a plan view of the first layer L1, the outer edge of the first lower surface LS1 is positioned outside the outer edge of the first upper surface US1. That is, the outermost outer edge E1 of the first layer L1 corresponds to the outer edge of the first lower surface LS1.

The outermost outer edge E2 of the second layer L2 is positioned in the second lower surface LS2, or in the second upper surface US2, or between the second lower surface LS2 and the second upper surface US2. In either case, the outermost outer edge E2 is positioned outside the outermost outer edge E1 in the detection electrode in which the first layer L1 having an orderly tapered cross-section and the second layer L2 are layered.

FIG. 5(b), FIG. 5(c), and FIG. 5(d) show specific cross-sectional shapes of the second layer L2 of FIG. 5(a).

FIG. 5(b) shows a case where the second layer L2 has a rectangular cross-section as in FIG. 4(b). The outermost outer edge E2 of the second layer L2 corresponds to the outer edge of either the second lower surface LS2 or the second upper surface US2.

FIG. 5(c) shows a case where the second layer L2 has an inversely tapered cross-section as in FIG. 4(c). The outermost outer edge E2 of the second layer L2 corresponds to the outer edge of the second upper surface US2. In the example depicted, the outer edge E21 of the second lower surface LS2 is positioned outside the outer edge E12 of the first upper surface US1; however, the outer edge E21 may be positioned inside the outer edge E12 or may match the outer edge E12. Furthermore, the outer edge E21 is positioned outside the outer edge E11 (outermost outer edge E1) of the first lower surface LS1; however, the outer edge E21 may be positioned inside the outer edge E11, or may match the outer edge E11.

FIG. 5(d) shows a case where the second layer L2 has an orderly tapered cross-section as in FIG. 4(d). The outermost outer edge E2 of the second layer L2 corresponds to the outer edge of the second lower surface LS2. Note that, in the example depicted, the outer edge E22 of the second upper surface US2 is positioned outside the outer edge E12 of the first upper surface US1; however, the outer edge E22 may be positioned inside the outer edge E12, or may match the outer edge E12. Furthermore, the outer edge E22 is positioned outside the outer edge E11 (outermost outer edge E1) of the first lower surface LS1; however, the outer edge E22 may be positioned inside the outer edge E11, or may match the outer edge E11.

FIG. 6 is a cross-sectional view of another example of the detection electrode Rx, taken along line A-B of FIG. 3. In this example, the first lower surface LS1 and the first side surface SS1 form an angle θ1 which is an obtuse angle.

As in FIG. 6, the first layer L1 has an inversely tapered cross-section which widens from the first lower surface LS1 to the first upper surface US1. In a plan view of the first layer L1, the outer edge of the first upper surface US1 is positioned outside the outer edge of the first lower surface LS1. That is, the outermost outer edge E1 of the first layer L1 corresponds to the outer edge of the first upper surface US1.

The outermost outer edge E2 of the second layer L2 is positioned in the second lower surface LS2, or in the second upper surface US2, or between the second lower surface LS2 and the second upper surface US2. In either case, the outermost outer edge E2 is positioned outside the outer edge E1 in the detection electrode in which the first layer L1 having an inversely tapered cross-section and the second layer L2 are layered.

FIG. 6(b), FIG. 6(c), and FIG. 6(d) show specific cross-sectional shapes of the second layer L2 of FIG. 6(a).

FIG. 6(b) shows a case where the second layer L2 has a rectangular cross-section as in FIG. 4(b). In this example, the outermost outer edge E2 of the second layer L2 corresponds to the outer edge of either the second lower surface LS2 or the second upper surface US2.

FIG. 6(c) shows a case where the second layer L2 has an inversely tapered cross-section as in FIG. 4(c). In this example, the outermost outer edge E2 of the second layer L2 corresponds to the outer edge of the second upper surface US2. Note that, in the example depicted, the outer edge E21 of the second lower surface LS2 is positioned outside the outer edge E12 (outermost outer edge E1) of the first upper surface US1; however, the outer edge E21 may be positioned inside the outer edge E12, or may match the outer edge E12.

FIG. 6(d) shows a case where the second layer L2 has an orderly tapered cross-section as in FIG. 4(d). The outermost outer edge E2 of the second layer L2 corresponds to the outer edge of the second lower surface LS2. Note that, in the example depicted, the outer edge E22 of the second upper surface US2 is positioned outside the outer edge E12 (outermost outer edge E1) of the first upper surface US1; however, the outer edge E22 may be positioned inside the outer edge E12 or may match the outer edge E12. Furthermore, the outer edge E22 is positioned outside the outer edge E11 of the first lower surface LS1; however, the outer edge E22 may be positioned inside the outer edge E11 or may match the outer edge E11.

Figure 7:
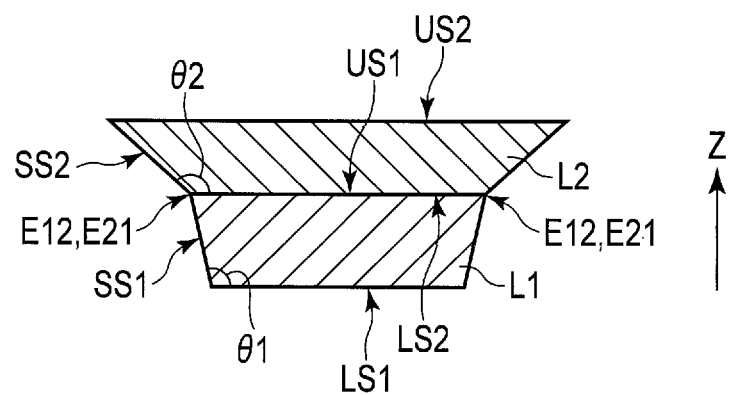
FIG. 7 is a cross-sectional view of another example of the detection electrode Rx, taken along line A-B of FIG. 3.

FIG. 7 is a cross-sectional view of another example of the detection electrode Rx, taken along line A-B of FIG. 3.

FIG. 7 shows another example of FIG. 6(b) in which the outer edge E21 of the second lower surface LS2 overlaps the outer edge E12 of the first upper surface US1. That is, the second lower surface LS2 does not protrude outside the first upper surface US1, or the first upper surface US1 does not protrude the second lower surface LS2. In the first layer L1, the first lower surface LS1 and the first side surface SS1 form an angle θ1 which is an obtuse angle, and in the second layer L2, the second lower surface LS2 and the second side surface SS2 form an angle θ2 which is an obtuse angle in which θ1 is different from θ2. In this example, θ2 is greater than θ1; however, θ1 may be set greater than θ2 in some cases.

In this example, the outermost outer edge E1 of the first layer L1 corresponds to the outer edge of the first upper surface US1, and the outermost outer edge E2 of the second layer L2 corresponds to the outer edge of the second upper surface US2, where the outermost outer edge E2 is positioned outside the outermost outer edge E1.

Figure 8:
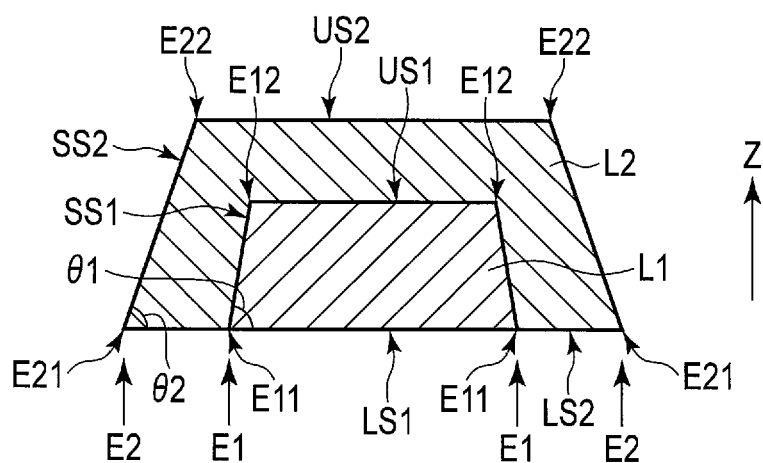
FIG. 8 is a cross-sectional view of another example of the detection electrode Rx, taken along line A-B of FIG. 3.

FIG. 8 is a cross-sectional view of another example of the detection electrode Rx, taken along line A-B of FIG. 3. In this example, the second layer L2 covers the first layer L1.

The first side surface SS1 and the first upper surface US1 contact the second layer L2. The second lower surface LS2 and, for example, the first lower surface LS1 are formed continuously, and the second lower surface LS2 extends outside the first lower surface LS1.

The cross-section of the first layer L1 and the second layer L2 may be a rectangular shape, square shape, orderly tapered shape, or inversely tapered shape.

Figure 9:
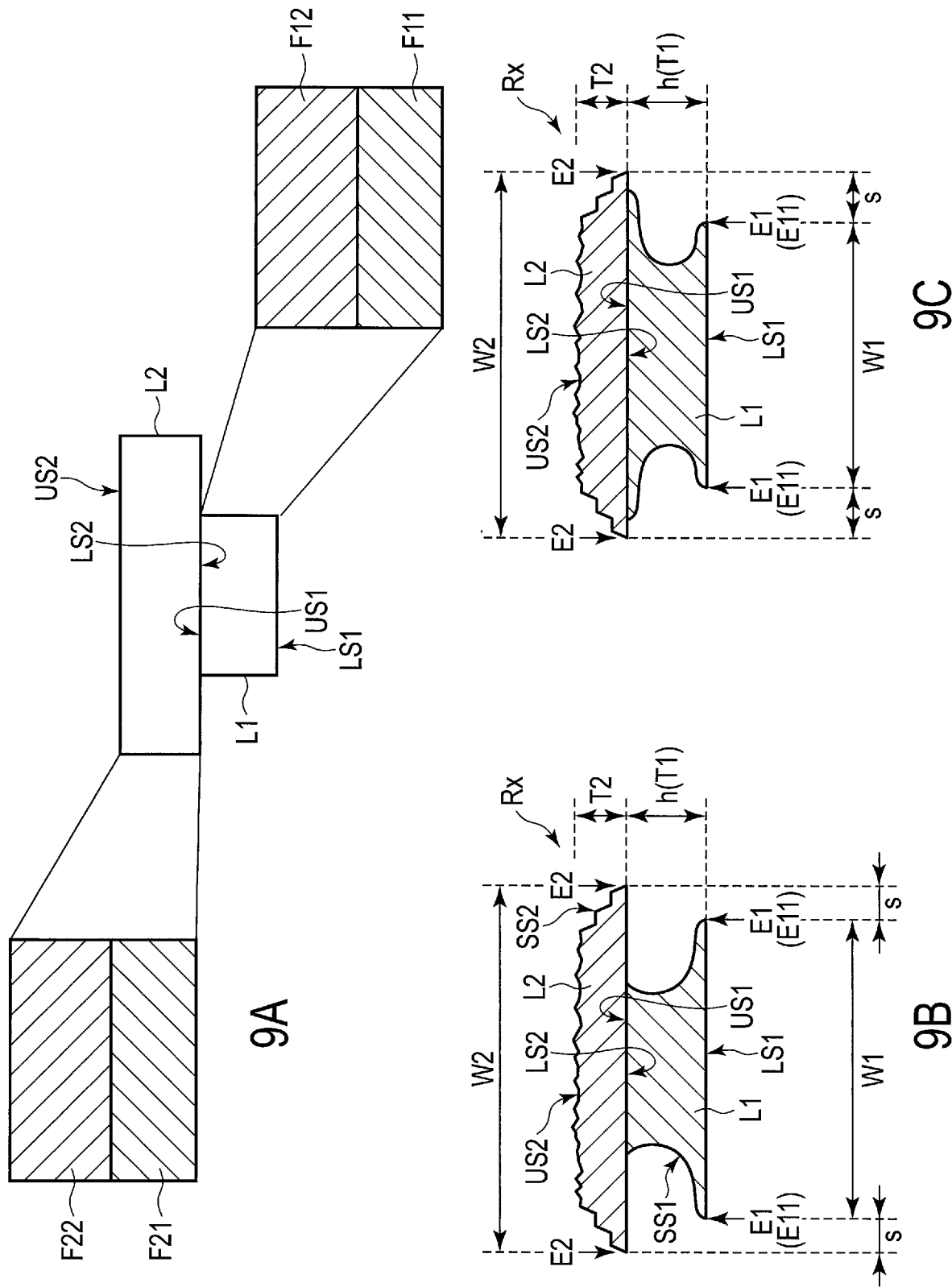
FIG. 9A is a cross-sectional view of an example of the structure of the detection electrode Rx of FIG. 3.
FIG. 9B shows an example of a cross-section of the detection electrode Rx in which the first layer L1 and the second layer L2 each have a multilayered structure.
FIG. 9C shows an example of a cross-section of the detection electrode Rx in which the first layer L1 and the second layer L2 each have a multilayered structure.

FIG. 9A is a cross-sectional view of an example of the structure of the detection electrode Rx of FIG. 3.

At least one of the first layer L1 and the second layer L2 may be formed as a multilayered structure in which several thin films are layered. In the example depicted, the first layer L1 includes a thin film F11 and a thin film F12. The thin film F11 is positioned in the first lower surface LS1 side and the thin film F12 is positioned in the first upper surface US1 side. The thin films F11 and F12 are a metal film formed of a metal such as Al, Ti, Ag, Mo, W, Cu, or Cr or of an alloy of any combination of aforementioned metals. The thin films F11 and F12 may be a transparent conductive film formed of a transparent conductive material such as indium tin oxide (ITO) or indium zinc oxide (IZO). If one of the thin films F11 and F12 is a metal film and the other is a transparent conductive film, the layering order thereof is not limited. Thus, there may be a case where the thin film F11 is a metal film and the thin film F12 is a transparent conductive film, and may be a case where the thin film F11 is a transparent conductive film and the thin film F12 is a metal film. Alternatively, the thin films F11 and F12 may be both a metal film. Furthermore, the thin films F11 and F12 are not limited to the metal film and the transparent conductive film, and thus, the thin films F11 and F12 may be insulating films.

Note that the first layer L1 is not limited to a double-layered structure, and it may be a multilayered structure including three or more layers or may be a monolayer structure including only one layer.

In the example depicted, the second layer L2 includes a thin film F21 and a thin film F2. The thin film F21 is positioned in the second lower surface LS2 side and the thin film F22 is positioned in the second upper surface US2 side. The thin film F21 contacts the thin film F12. For example, the thin film F21 and the thin film F22 are conductive films or dielectric films of different refractive indices. The dielectric film is, for example, an inorganic film of a metal oxide. Here, a conductive film or a dielectric film of high refractive index exerts, for example, a refractive index of approximately 2.0 to 3.5, and a conductive film or a dielectric film of low refractive index exerts, for example, a refractive index of approximately 1.3 to 2.0. For example, a dielectric film of high refractive index is formed of $TiO_2$, $Nb_2O_5$, or $Ta_2O_5$, and a dielectric film of low refractive index is formed of $SiO_2$ or $MgF_2$. Note that the dielectric film may be an organic film of thermal/photo curing resin. The conductive film is a metal film formed of a metal such as Mo, W, or Ti or of an alloy of any combination of aforementioned metals. Note that the second layer L2 is not limited to a double-layered structure, and it may be a multilayered structure including three or more layers or may be a monolayer structure.

Either the thin film F21 or the thin film F22 may be a light absorption film, for example. A light absorption film is, for example, a thin film having a thickness of 5 to 20 nm with a material exerting a refractive index of 1 or more and a light absorption index of 0.5 or more in a visible range. A light absorption film is formed of a metal such as Nb, C, Cr, Fe, Ge, Ni, Pd, Pt, Rh, Ti, $TiN_xW_y$, Mn, Ru, Mo, or PbTe or of alloy of any combination of aforementioned metals. Note that the light absorption film may be an organic film such as black resin.

Note that the thin films F21 and F22 are not limited to a dielectric film or a light absorption film, and they may be a light reflective film which reflects light, or a protection film which suppresses damage to the second layer L2 or corrosion of the metal material, or the like. Furthermore, the second layer L2 is not limited to a double-layered structure, and it may be a multilayered structure including three or more layers or may be a monolayer structure.

FIG. 9B and FIG. 9C each show an example of a cross-section of the detection electrode Rx in which the first layer L1 and the second layer L2 each have a multilayered structure.

If the first layer L1 and the second layer L2 are each formed as a multilayer containing several materials of different properties, the first layer L1 and the second layer L2 may have various cross-sectional shapes because of an etching rate of each material of the layers with respect to an etching fluid. In the examples of FIG. 9B and FIG. 9C, the second side surface SS2 of the second layer L2 has a step-like concave/convex shape and the second upper surface US2 of the second layer L2 has a concave/convex shape. Furthermore, the first layer L1 has a constricted shape. In that case, the outermost outer edge E2 is positioned outside the outermost outer edge E1.

For example, as shown in FIG. 9B, even if the first lower surface LS1 is irregularly widened, the outermost outer edge E1 becomes the outer edge E11 of the first lower surface LS1. On the other hand, if the first layer L1 has irregularly widened first upper surface US1 and first lower surface LS1 as shown in FIG. 9C, the outer edge E11 of the first lower surface LS1 is defined as the outermost outer edge E1 even through the first upper surface US1 protrudes outside the first lower surface LS1. This is because the first upper surface US1 extends along the second lower surface LS2 and does not protrude in an area which is substantially visible.

Note that, as shown in FIG. 9B, the outermost outer edge E1 of the first layer L1 has a width W1 which is preferably a few to a dozen μm, and more preferably, 1 to 5 μm as a thin line detection electrode Rx. Furthermore, the outermost outer edge E2 of the second layer L2 has a width W2 which is greater than the width W1 and is preferably a few to a dozen μm, and more preferably, 2 to 6 μm. Furthermore, a gap s between the outermost outer edge E1 and the outermost outer edge E2 adjacent to each other in the width direction of the detection electrode Rx is preferably a few hundreds nm, and more preferably, is 200 nm or less, and still more preferably, 150 nm or less.

In consideration of the above, a height h of the outermost outer edge E2 with respect to the first lower surface LS1 and the gap s should satisfy the following relationship of $$h/s < 2$$

and in that case, even if the detection electrode Rx is viewed in a plan view, the first layer L1 is not visible, and even if the detection electrode Rx is viewed from a slightly slanting viewpoint, the first layer L1 is difficult to recognize since the second layer L2 protrudes by the gap s. If the first layer L1 is viewed from a more slanting viewpoint, the first layer L1 may possibly be recognized; however, the components of the light incident from such a slanting angle are mostly reflected by the first layer L1 and enter the second lower surface LS2 and the other substrates below the first layer L1. Thus, the light reflected by the first layer L1 becomes very glimmer and the visibility thereof becomes very low. In consideration of the above, the first layer L1 is preferably formed in an orderly tapered shape and the second layer L2 is formed in an orderly tapered shape or in an inversely tapered shape.

Furthermore, a thickness T1 between the first lower surface LS1 and the first upper surface US1 is, preferably, 200 to 400 nm as a thin line detection electrode Rx. Furthermore, a thickness T2 between the second lower surface LS2 and the second upper surface US2 is, preferably, 50 to 200 nm.

Figure 10:
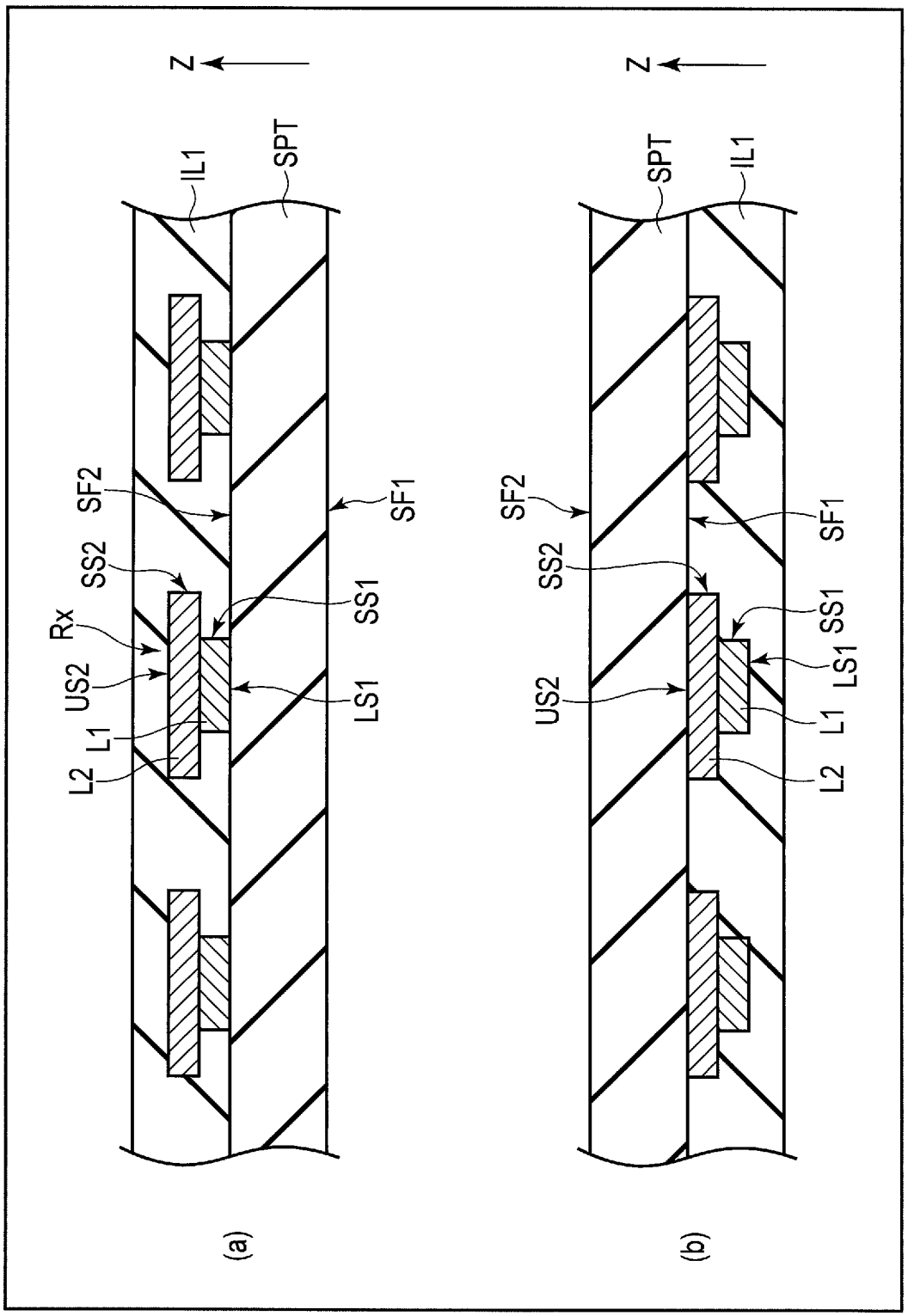
FIG. 10 is a cross-sectional view of an example of the structure of a sensor SE including the detection electrode Rx of FIG. 3.

FIG. 10 is a cross-sectional view of an example of the structure of the sensor SE including the detection electrode Rx of FIG. 3.

FIG. 10(a) shows an example in which the first layer L1 contacts a support.

A support SPT includes a first main surface SF1 and a second main surface SF2 which is positioned above the first main surface SF1. If the sensor SE is stored in the display panel PNL, the support SPT corresponds to, for example, the second substrate SUB2. If the sensor SE is a sensor device which is attachable to the display panel PNL, the support SPT corresponds to, for example, a substrate. In the example depicted, the detection electrode Rx is disposed on the second main surface SF2 of the support SPT. The support SPT and the detection electrode Rx are covered with an insulating film IL1. The first layer L1 is disposed on the support SPT and the first lower surface LS1 contacts the second main surface SF2. The second layer L2 is disposed on the first layer L1 and the second upper surface US2 contacts the insulating film IL1. The insulating film IL1 contacts the first side surface SS1 and the second side surface SS2.

FIG. 10(b) shows an example in which the second layer L2 contacts a support.

In the example depicted, the detection electrode Rx is disposed on the first main surface SF1 of the support SPT. The support SPT and the detection electrode Rx are covered with an insulating film IL1. The second layer L2 is disposed below the support SPT and the second upper surface US2 contacts the first main surface SF1 of the support SPT. The first layer L1 is disposed on the second layer L2 and the first lower surface LS1 contacts the insulating film IL1. The insulating film IL1 contacts the first side surface SS1 and the second side surface SS2.

In the examples of FIG. 10(a) and FIG. 10(b), the insulating film IL1 functions as a protection layer which suppresses damage and corrosion of the detection electrode Rx. Furthermore, the insulating film IL1 may include other function layers such as an adhesive layer which adhere the support SPT to a different material.

Now, a manufacturing method of the sensor SE in a structure where the display panel is a support will be explained.

FIG. 11 is a cross-sectional view showing a manufacturing method of a display device including the sensor SE.

FIG. 11(a) shows a step of forming a first layer L1 and a second layer L2. Initially, the first layer L1 is formed on the entirety of the second substrate SUB2 of the display panel PNL. Then, the second layer L2 is formed on the entirety of the first layer L1. That is, the first lower surface LS1 contacts the display panel PNL and the first upper surface US1 contacts the second lower surface LS2. The second upper surface US2 is exposed.

FIG. 11(b) shows a step of patterning the detection electrode Rx.

In this step, a photoresist which is patterned as a desired shape is formed on the second layer L2. Then, using the photoresist as a mask, the first layer L1 and the second layer L2 are together etched with an etching fluid which mainly contains phosphoric acid, and the detection electrode Rx is formed. At that time, an etching rate of the first layer L1 is set higher than that of the second layer L2. Furthermore, an etching condition is determined to form a desired cross-sectional shape of each of the first layer L1 and the second layer L2. In this step, the dummy electrode DR, lead line L, and terminal TE of FIG. 3 are patterned together with the detection electrode Rx. Then, the photoresist is removed. If the first layer L1 and the second layer L2 are conductive layers, the step ends here; however, if the second layer L2 is an insulating layer, only the second layer L2 of the terminal TE is removed by additional etching. Note that, as described later with reference to FIG. 14, the display device DSP includes a color filter, light shielding layer, and light absorption layer such as decorative printing. Thus, the degradation in visibility of the display image caused by external light reflection in the first side surface SS1 of the first layer L1 and multiple reflection between the first layer L1 and each layer of the display panel PNL can be suppressed.

FIG. 11(*c*) shows a step of forming an insulating film IL2.

In this step, an insulating film IL1 which functions as a protection layer is formed on the display panel PNL and the detection electrode Rx. The insulating film IL1 covers the detection electrode Rx. The insulating film IL1 is not specifically limited as long as it is light transmissive and is formed of an electrically insulating material, and the insulating film IL1 may be an inorganic insulating film or may be an organic insulating film. Note that a haze value of the insulating film IL1 is, preferably, set to 1 or less. Thereby, the external light diffused by the insulating film IL1 entering the first side surface SS1 can be suppressed, and the degradation in visibility of the display image can be suppressed.

FIG. 11(*d*) shows a step of disposing a polarizer PL.

In this step, the polarizer PL is adhered onto the insulating film IL1. The polarizer PL is disposed above the second layer L2.

FIG. 11(*e*) shows a step of disposing a cover CV.

In this step, the cover CV is adhered onto the polarizer PL. The insulating film IL2 functions as an adhesive layer to adhere the display panel PNL and the cover CV. In the example depicted, the insulating film IL2 covers the insulating film IL1 and the polarizer PL. The cover CV is formed of a transparent substrate such as a glass substrate or a resin substrate.

Figure 12:
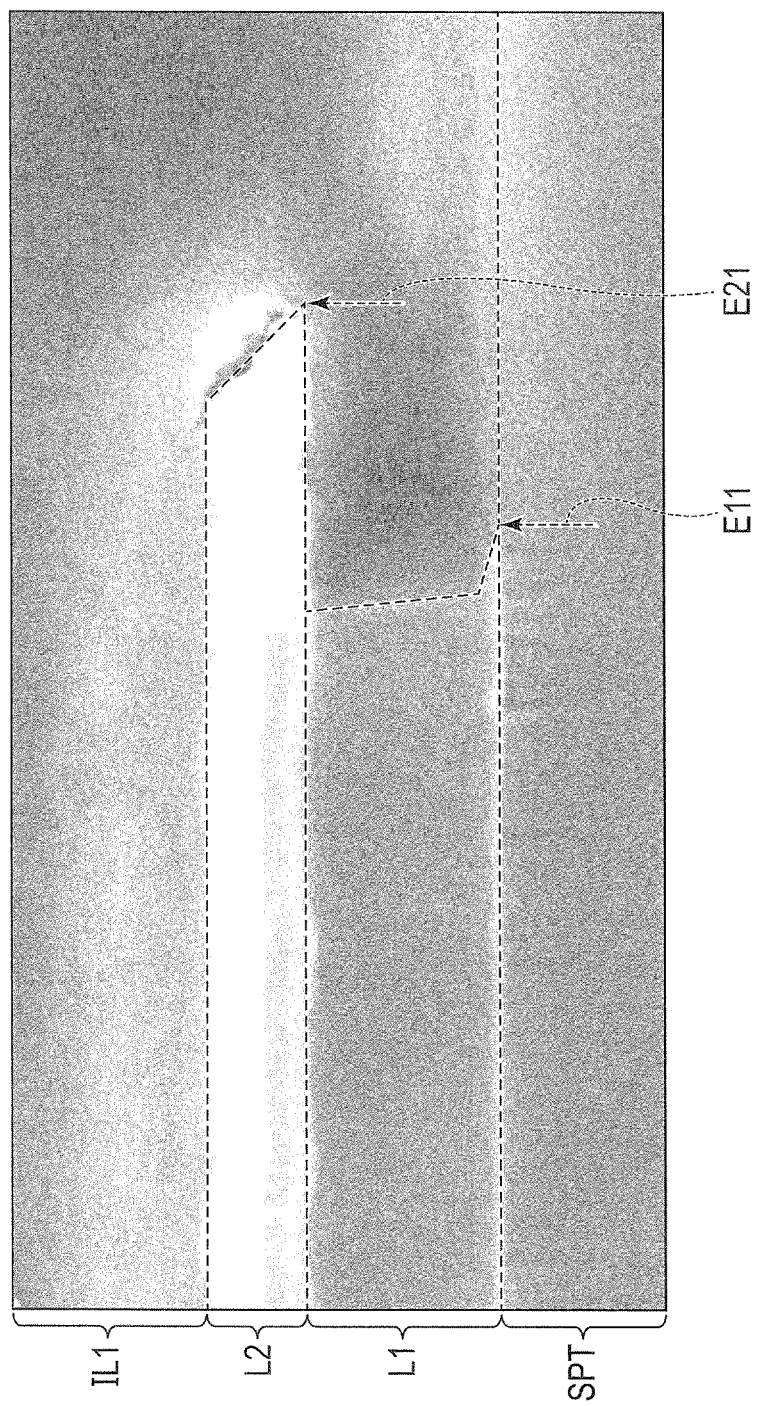
FIG. 12 is a photograph of a cross-section of the detection electrode formed through the steps of FIG. 11.

FIG. 12 is a photograph of a cross-section of the detection electrode formed through the steps of FIG. 11.

FIG. 12 is a two-dimensional electrophotograph of a cross-section of the detection electrode Rx taken by a scanning electron microscope (SEM). The first layer L1 is formed on the support SPT and the second layer L2 is formed on the first layer L1. In the figure, the first layer L1 has an orderly tapered shape and the second layer L2 has an orderly tapered shape. The outer edge E21 (outermost outer edge E2) of the lower surface of the second layer L2 is positioned outside the outer edge E11 (outermost outer edge E1) of the lower surface of the first layer L1. Furthermore, the first layer L1 and the second layer L2 are covered with the insulating film IL1.

FIG. 13 shows the basic structure of the display device DSP of FIG. 1 and its equivalent circuit.

The display device DSP includes not only the display panel PNL but also the first drive circuit Dr1, signal line drive circuit SD, and scan line drive circuit GD in the non-display area NDA outside the display area DA.

The display panel PNL includes a plurality of pixels PX in the display area DA. The pixels PX are formed in an m×n matrix spreading in both the first direction X and the second direction Y (where each of m and n is a positive integer). Furthermore, the display panel PNL includes n scan lines G (G1 to Gn) and m signal lines S (S1 to Sm) in the display area DA.

Scan lines G extend in the first direction X and are drawn outside the display area DA to be connected to the scan line drive circuit SD. The scan lines G are arranged in the second direction Y at intervals. Signal lines S extend in the second direction Y and are drawn outside the display area DA to be connected to the signal line drive circuit SD. The signal lines S are arranged in the first direction X at intervals to cross the scan lines G. Note that the scan lines G and signal lines S do not necessarily extend linearly and they may be formed to partly bend. The sensor drive electrodes Tx function as a common electrode CE shared by the pixels PX and are drawn outside the display area DA to be connected to the first drive circuit Dr1.

Each pixel PX includes, for example, a switching element SW, pixel electrode PE, common electrode CE, and liquid crystal layer LC. The switching element SW is, for example, a thin film transistor. The switching element SW is electrically connected to a scan line G and a signal line S. The pixel electrode PE is electrically connected to the switching element SW. The pixel electrode PE is opposed to the common electrode CE. A capacitance CS is formed between the common electrode CE and the pixel electrode PE, for example.

Figure 14:
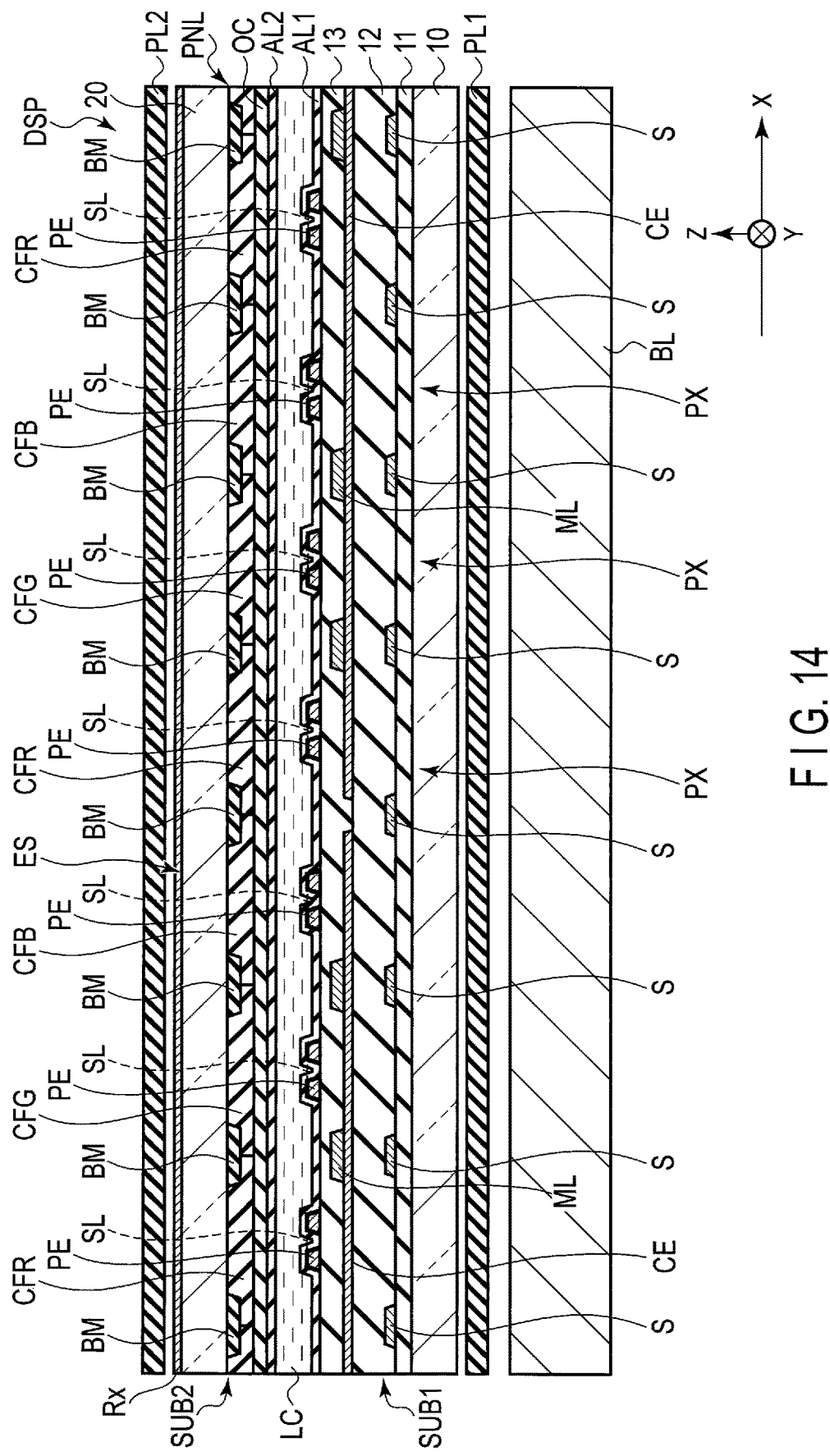
FIG. 14 is a cross-sectional view of a partial structure of the display device DSP.

FIG. 14 is a cross-sectional view of a partial structure of the display device DSP.

In the present embodiment, the display panel PNL may be structured as a vertical field display mode in which a vertical field along the normal of the substrate main surface is used, or as an inclined field display mode in which a field inclined with respect to the normal of the substrate main surface is used, or as a horizontal field mode in which a horizontal field along the substrate main surface is used. Alternatively, the display panel PNL may be structured to correspond to a display mode of a combination of the aforementioned vertical field mode, horizontal field mode, and inclined field mode. Note that the substrate main surface is a surface parallel to the X-Y plane which is defined by the first direction X and the second direction Y which are orthogonal to each other. In the vertical field display mode or the inclined field display mode, pixel electrodes PE and the like are disposed on the first substrate SUB1 while the common electrode CE is disposed on the second substrate SUB2. In the horizontal field mode, both the pixel electrodes PE and the common electrode CE are disposed on the first substrate SUB1.

In the example depicted, the display panel PNL is structure to correspond to the horizontal field display mode. In the display panel PNL, the first substrate SUB1 is opposed to the second substrate SUB2 with a certain gap therebetween. The liquid crystal layer LC is disposed in the gap between the first substrate SUB1 and the second substrate SUB2.

The first substrate SUB1 includes a light transmissive first insulating substrate 10 such as a glass substrate or a resin substrate. The first substrate SUB1 includes, above the first insulating substrate 10, that is, in the side opposed to the second substrate SUB2, a scan line, switching element, signal line S, common electrode CE, pixel electrode PE, first insulating film 11, second insulating film 12, third insulating film 13, and first alignment film AL1. In the example depicted, both the scan line and the switching element are omitted.

The first insulating film 11 is positioned above the first insulating substrate 10, the second insulating film 12 is positioned above the first insulating film 11, and the third insulating film 13 is dispose above the second insulating film 12. The signal line S is disposed between the first insulating film 11 and the second insulating film 12. The common electrode CE is disposed between the second insulating film 12 and the third insulating film 13. The pixel electrode PE is positioned above the third insulating film 13. Each pixel electrode PE is disposed between adjacent signal lines S to be opposed to the common electrode CE. Each pixel electrode PE includes a slit SL at the position opposed to the common electrode CE. The common electrode CE and the pixel electrode PE are formed of a transparent conductive material such as indium tin oxide (ITO) or indium zinc oxide (IZO). Note that, in the example depicted, a metal layer ML is disposed above the common electrode CE to decrease the resistance of the common electrode CE; however, the metal layer ML may be omitted. The first alignment film AL1 is disposed above the pixel electrode PE and the third insulating film 13.

The second substrate SUB2 includes a light transmissive second insulating substrate 20 such as a glass substrate or a resin substrate. The second substrate SUB2 includes, below the second insulating substrate 20, that is, in the side opposed to the first substrate SUB1, a light shielding layer BM, color filters CFR, CFG, and CFB, overcoat layer OC, and second alignment film AL2.

The light shielding layer BM is positioned on the inner surface of the second insulating substrate 20 to define each pixel. The color filters CFR, CFG, and CFB are each disposed on the inner surface of the second insulating substrate 20 and each partly overlap the light shielding layer BM. The color filter CFR is a red color filter positioned to correspond to a red pixel and is formed of a red resin material. The color filter CFG is a green color filter positioned to correspond to a green pixel and is formed of a green resin material. The color filter CFB is a blue color filter positioned to correspond to a blue pixel and is formed of a blue resin material. The overcoat layer OC covers the color filters CFR, CFG, and CFB. The overcoat layer OC is formed of a transparent resin material. The second alignment film AL2 covers the overcoat layer OC.

The detection electrode Rx is positioned in the outer surface ES side of the second insulating substrate 20. In the example depicted, the detection electrode Rx contacts the outer surface ES of the second insulating substrate 20; however, an insulating member may be interposed therebetween. The detailed structure of the detection electrode Rx has been described above. Each detection electrode Rx is opposed to the common electrode CE with dielectrics such as the third insulating film 13, first alignment film AL1, liquid crystal layer LC, second alignment film AL2, overcoat layer OC, color filters CFR, CFG, and CFB, and second insulating substrate 20.

The first polarizer PL1 is disposed between the first insulating substrate 10 and the backlight unit BL. The second polarizer PL2 is disposed above the detection electrode Rx. The first polarizer PL1 and the second polarizer PL2 may include a retardation film, if necessary. The first polarizer PL1 and the second polarizer PL2 are arranged in a crossed-Nicol state in which absorption axes thereof cross orthogonally.

In the present embodiment, the detection electrode Rx of the sensor SE includes the first layer L1, and the second layer L2 which is disposed above the first layer 11 and has a reflectivity lower than that of the first layer L1. The outermost outer edge E2 of the second layer L2 is disposed outside the outermost outer edge E1 of the first layer L1, and thus, the external light entering the first side surface SS1 can be suppressed. Even if the external light enters the first side surface SS1, the external light reflected by the first side surface SS1 mainly enters the second lower surface LS2. Thus, the visibility of the first layer L1 when the display panel is viewed from a slanting viewpoint can be decreased. Therefore, in a combination of the sensor and the display device in which the sensor is formed of a metal, glare caused by the metal sensor can be significantly reduced and the degradation in visibility of image displayed by the display device can be suppressed.

Furthermore, the second layer L2 has a significantly low reflectivity and is substantially recognized as black. Thus, when the second layer L2 is viewed from the observational position, the detection electrode Rx which is a meshed thin lines disposed on the outermost surface is, macroscopically, very difficult to recognize, and when an image is displayed on the display panel PNL, the detection electrode Rx is substantially unrecognizable or is not at all recognized by a viewer. On the other hand, when the display panel PNL has no image thereon, that is, a black display (R=0, G=0, and B=0 in the entirety of the display area DA), the detection electrode Rx is merged with the black display, and the blackness of the black display is not ruined, if anything, the blackness of the display panel PNL will be increased by a combination of the detection electrode Rx and the black display. Consequently, the performance of contrast can be improved in the display panel PNL.

If the detection electrode Rx has a cross-section as shown in FIGS. 4 to 8, the above-described advantages can be achieved. Especially, if the second layer has an inversely tapered cross-sectional shape as shown in FIG. 4(c), FIG. 5(c), FIG. 6(c), and FIG. 7, and the detection electrode Rx is observed from the observational position at the arrow tip of the third direction Z, only the second upper surface US2 which is relatively flat faces the observational position, and thus, the reflection of the external light entering the detection electrode Rx from the observational position can be prevented almost perfectly. Especially, if the second layer has an orderly tapered cross-sectional shape as shown in FIG. 4(d), FIG. 5(d), and FIG. 6(d), and the detection electrode Rx is observed from the observational position greatly slanting from the third direction Z, exposure of the first side surface SS1 can be prevented and the reflection of the external light by the first side surface SS1 can be suppressed. Furthermore, as shown in FIG. 8, if not only the first upper surface US1 but also the first side surface SS1 are covered with the second layer L2, the reflection of external light by the first upper surface US1 and the first side surface SS1 can be suppressed.

Furthermore, since the detection electrode Rx and the lead line L are disposed on the outer surface of the second insulating substrate 20, they can be formed through the same process with the same materials. Furthermore, since the detection electrode Rx and the lead line L are formed of a metal which has very low electrical resistance value as compared to a transparent conductive material, they can be formed in a thin line which can be drawn in a long distance as its thin line width is maintained.

Furthermore, amongst the first layer L1 and the second layer L2 of the detection electrode Rx, if the second layer L2 which is positioned to be apart from the support SPT (second insulating substrate 20) is a conductive layer, the detection electrode Rx and the second drive circuit Dr2 can be electrically connected through the terminal TE without removing the second layer L2 of the terminal TE after the etching process of both the detection electrode Rx and the terminal TE. That is, increase of the production costs caused by increase of steps can be suppressed.

The first layer L1 is a multilayered film including, for example, a metal thin film F11 and a transparent conductive thin film F12. The thin film F11 exerts good conductivity and the thin film F12 suppresses corrosion of the thin film F11, the detection performance of the sensor SE can be improved and the deterioration of the performance thereof can be suppressed.

Note that the display device DSP includes the second polarizer PL2 which is positioned above the second layer L2. The external light entering the display device DSP is sufficiently weakened by the second polarizer PL2 and the second layer L2, and thus, the degradation in visibility of display image caused by reflection by the first layer L1 can further be suppressed. Here, even if the detection electrode Rx is disposed above the second polarizer PL2, the above-described advantages can be achieved. Such a variation will be explained with reference to FIG. 15.

Figure 15:
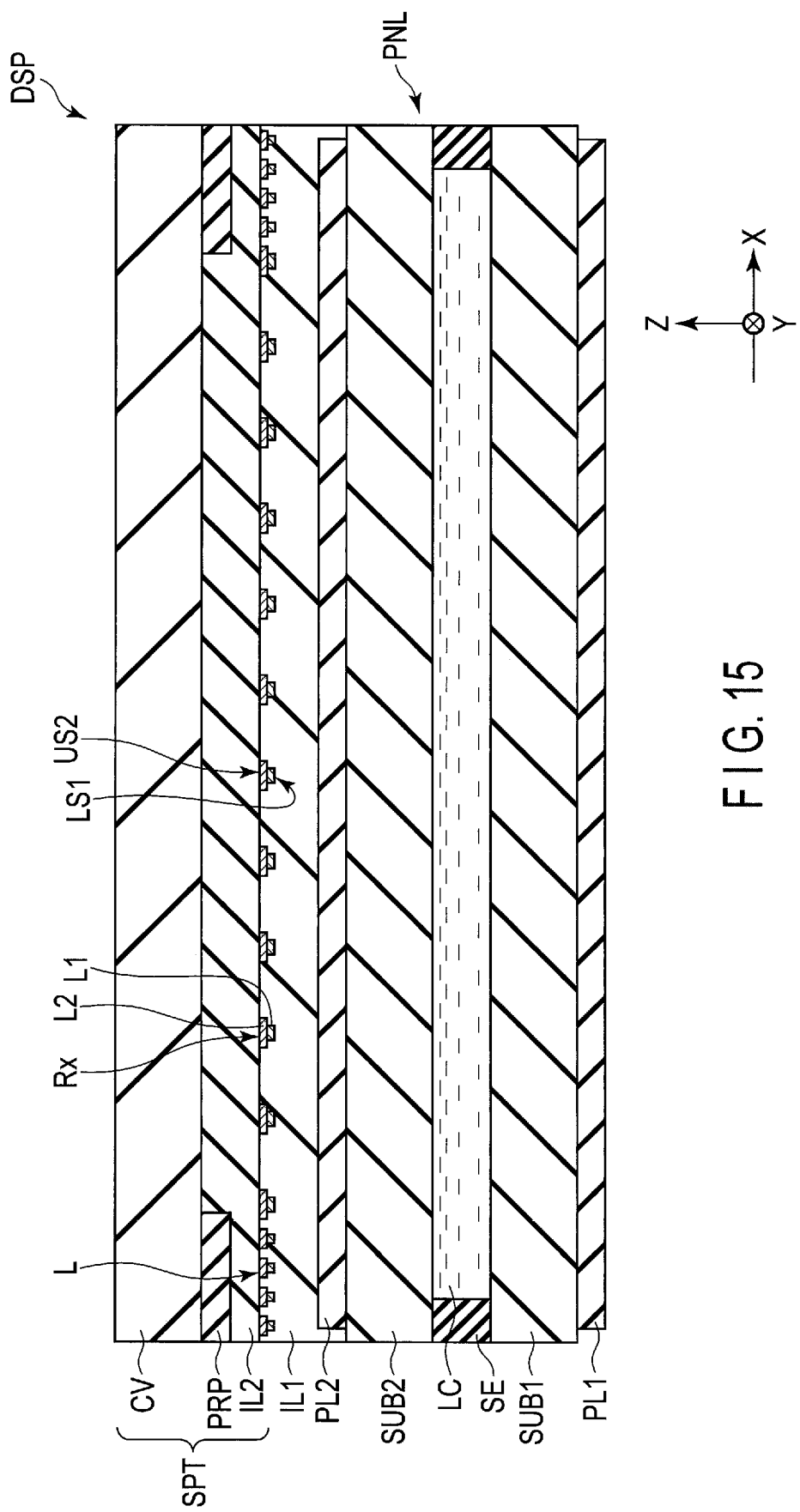
FIG. 15 is a cross-sectional view of a variation of the display panel PNL in which the detection electrode Rx is arranged in a position different from the embodiment.

FIG. 15 a variation of the cross-sectional view of a variation of the display panel PNL in which a detection electrode Rx is arranged in a position different from the above embodiment. That is, the detection electrode Rx is disposed in the cover CV side, and in this respect, the variation of FIG. 15 is different from the example of FIG. 14.

The display device DSP includes the second polarizer PL2 on the second substrate SUB2. The cover CV is disposed above the display panel PNL. A peripheral light shielding layer PRP is provided with the edge of the lower surface of the cover CV to shield the light in the periphery of the display area DA. The insulating film IL2 is provided with the lower surface of the cover CV. The insulating film IL2 covers the peripheral light shielding layer PRP. The insulating film IL2 is an overcoat layer formed of an insulating material having the haze value of 1 or less. The support SPT corresponds to the cover CV and the insulating film IL2, and the detection electrode Rx and the lead line L are formed on the lower surface of the insulating film IL2. The insulating film IL1 is disposed between the detection electrode Rx and the second polarizer PL2. The insulating film IL1 adheres the display panel PNL and the cover CV. The second upper surface US2 of the second layer L2 contacts the insulating film IL2 and the first lower surface LS1 of the first layer L1 contacts the insulating film IL1. Although this is not depicted, the sensor drive electrode Tx may be disposed arbitrarily, and may be stored in the first substrate SUB1 or the second substrate SUB2, or may be disposed between the second substrate SUB2 and the second polarizer PL2.

In the above description of the embodiment, the sensor-equipped display device includes the common electrode CE in the display panel PNL which functions as the sensor drive electrode Tx, and further includes the detection electrodes Rx opposed to the sensor drive electrode Tx and lead lines L electrically connected to the detection electrodes Rx. However, no limitation is intended thereby, and the embodiment may be applied to a sensor device which is used in combination with a display panel including no sensor element such as a sensor drive electrode or a detection electrode wherein the sensor device and the display panel are combined through adhesion or the like. Such a sensor device can achieve the advantages obtained in the above embodiment. Hereinafter, an example in which a sensor device is applied to a display panel will be explained.

Figure 16:
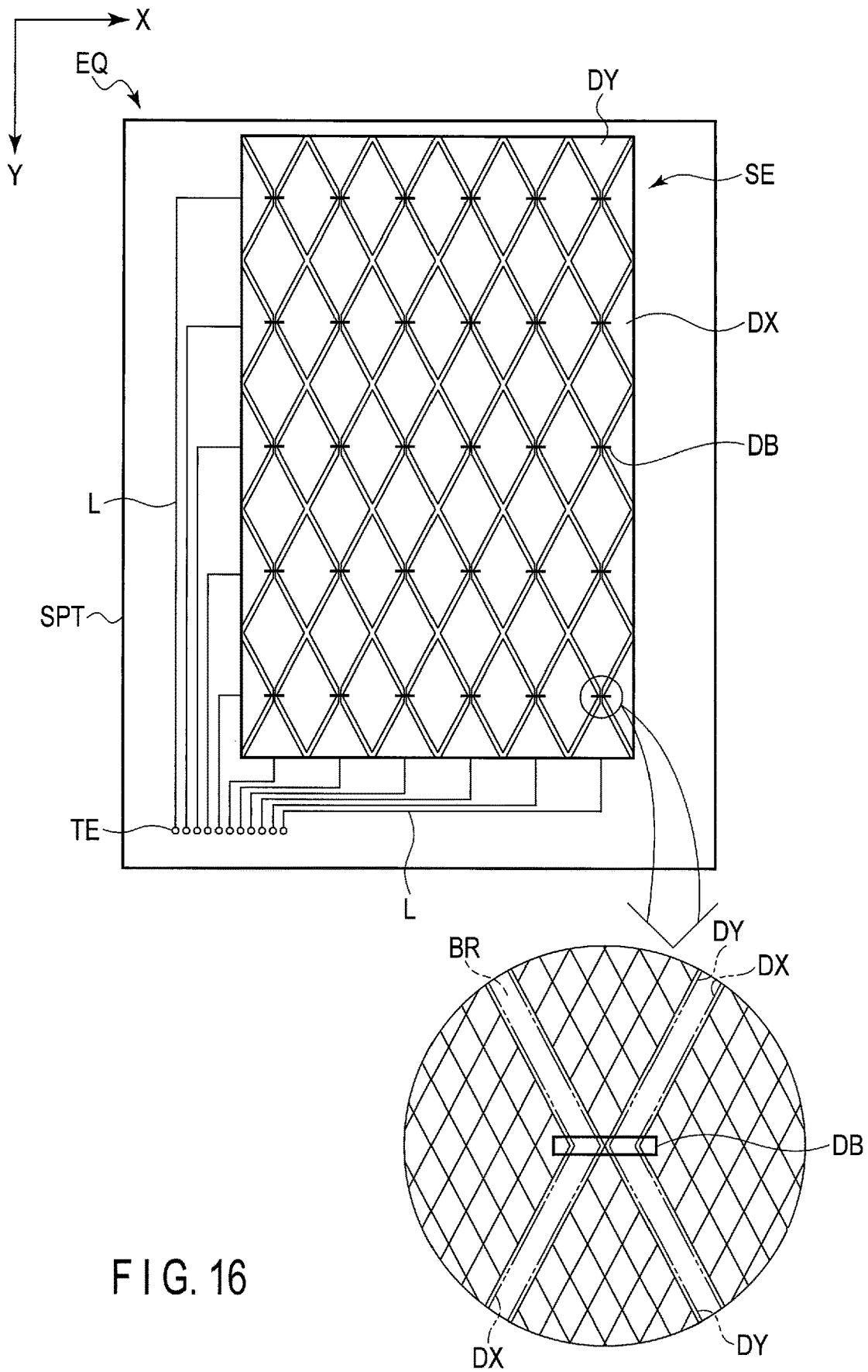
FIG. 16 shows an example of the structure of a sensor device EQ of the embodiment.

FIG. 16 shows an example of the structure of a sensor device EQ of the embodiment.

The sensor device EQ includes, on the support SPT, first electrodes DX, second electrodes DY, lead lines L, and terminals TE. The first electrodes DX and the second electrodes DY are disposed in the display area DA while the lead lines L and the terminals TE are disposed in the non-display area NDA. In a plan view, each of the first electrode DX and the second electrode DY is formed as a rhombus. The first electrodes DX and the second electrodes DY are arranged in the first direction X and the second direction Y. A second electrode DY is adjacent to each side of a first electrode DX, and a first electrode DX is adjacent to each side of a second electrode DY.

The first electrodes DX arranged in the first direction X are electrically connected to each other in bridges DB and are electrically connected to one of the lead lines L. The lead lines L electrically connect the terminals TE and the first electrodes DX. The first electrodes DX arranged in the second direction Y are electrically isolated from each other, and are electrically connected to different lead lines L. The lead lines L electrically connect the terminals TE and the first electrodes DX.

Furthermore, the second electrodes DY arranged in the second direction Y are formed such that their opposed corners are formed continuously in the lower layer of the bridges DB and are electrically connected to each other. The second electrode DY arranged in the second direction Y are electrically connected to one of the lead lines L. The lead lines L electrically connect to the terminals TE and the second electrodes DY. The second electrodes DY arranged in the first direction X are electrically isolated from each other, and are electrically connected to different lead lines L. The lead lines L electrically connect the terminals TE and the second electrodes DY.

The first electrodes DX and the second electrodes DY are depicted as plates in the figure for the sake of simpler explanation; however, in the actual form, the first electrodes DX and the second electrodes DY are formed in a mesh. Furthermore, as long as the first electrodes DX and the second electrodes DY are formed of thin lines, the shape thereof is not limited and it may be a linear wave shape (or triangular wave shape), or circular wave shape such as a sine wave, or may be a combination of the aforementioned wave shapes.

Note that the sensor device EQ may be of either mutual capacitance or self capacitance. If the sensor device EQ is a touchpanel of mutual capacitance, the first electrodes DX correspond to the detection electrodes Rx and the second electrodes DY correspond to the sensor drive electrodes Tx, for example. If the sensor device EQ is a touchpanel of self capacitance, both the first electrodes DX and the second electrodes DY correspond to the detection electrodes Rx.

Figure 17:
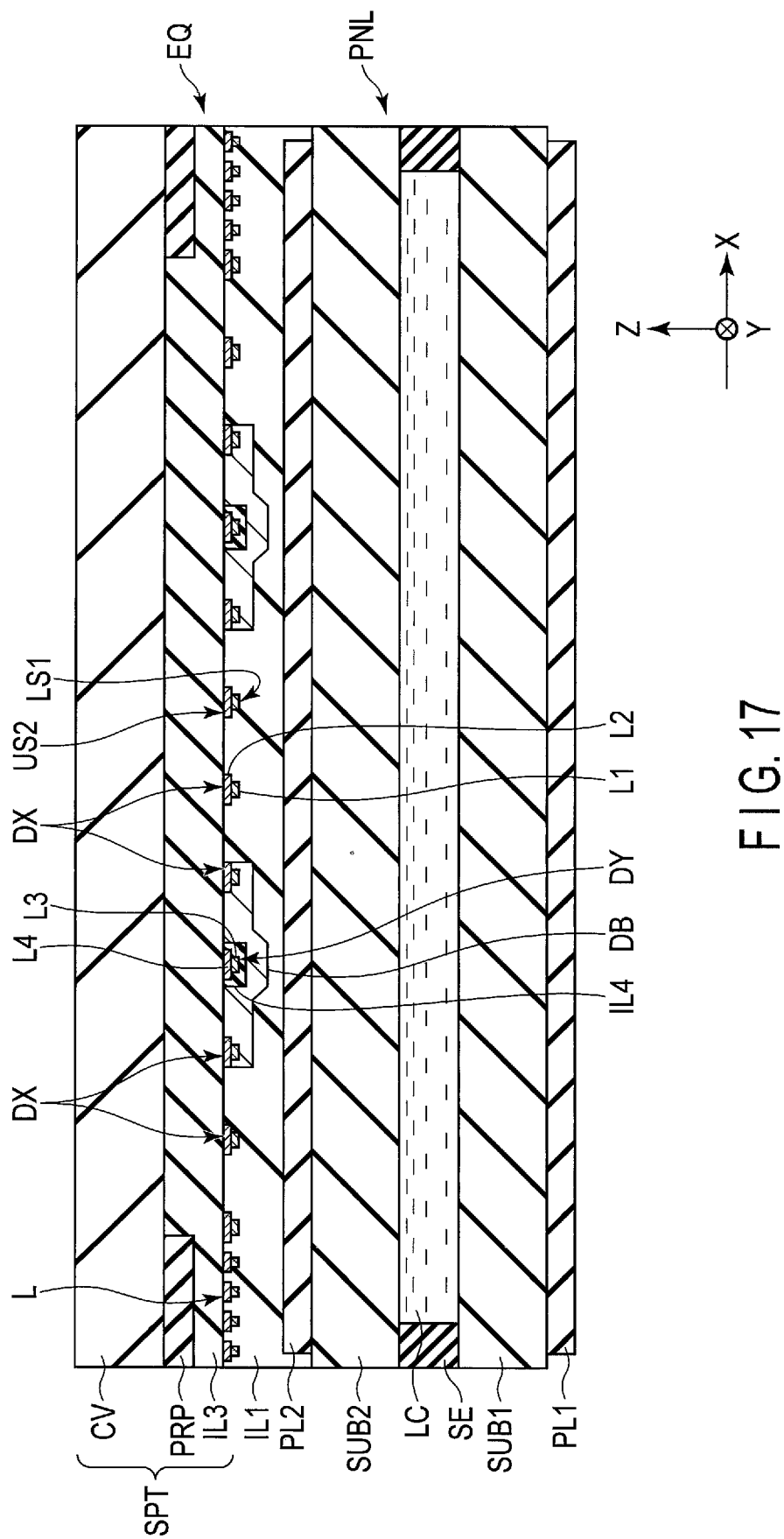
FIG. 17 is a cross-sectional view of the display device DSP including the sensor device EQ of FIG. 16.

FIG. 17 is a cross-sectional view of the display device DSP including the sensor device EQ of FIG. 16. The sensor device EQ depicted is a touchpanel of mutual capacitance. Note that FIG. 17 is a cross-section of the area including the bridges DB taken along the first direction X.

The support SPT includes a cover CV, peripheral light shielding layer PRP, and insulating film IL3. The peripheral light shielding layer PRP is disposed on the lower surface of the cover CV. The insulating film IL3 is disposed on the lower surface of the cover CV to cover the peripheral light shielding layer PRP.

The first electrode DX (detection electrode) includes a first layer L1 and the second layer L2. The second electrode DY (sensor drive electrode) includes a third layer L3 and a fourth layer L4. In the example depicted, the first electrode DX and the second electrode DY are disposed on the same surface of the support SPT. The third layer L3 and the first layer L1 are disposed in the same layer, and the fourth layer L4 and the second layer L2 are disposed in the same layer. The third layer L3 may be formed of the same material used for the first layer L1, and the fourth layer L4 may be formed of the same material used for the second layer L2. In that case, the lead lines L may be disposed on the same surface where the first electrode DX and the second electrode DY are disposed in the same multilayer manner. The second layer L2 is disposed below the insulating film IL3, and the first layer L1 is disposed below the second layer L2. The second upper surface US2 of the second layer L2 contacts the insulating film IL3 (support SPT). The second electrode DY is covered with the insulating film IL4. The insulating film IL4 and the first electrodes DX adjacent to the second electrode DY are covered with the bridge DB. The bridge DB electrically connects the first electrodes DX and is electrically isolated from the second electrode DY.

The display panel PNL includes the second polarizer PL2 on the second substrate SUB2. The insulating film IL1 is disposed between the second polarizer PL2 and the sensor device EQ. The insulating film IL1 covers the first electrode DX, bridge DB, and lead line L. In the first electrodes DX which are not covered by a bridge DB, the first lower surface LS1 contacts the insulating film IL1.

The sensor device EQ of FIGS. 16 and 17 may be incorporated in the display panel PNL. Specifically, in that case, the second substrate SUB2 is used as a support SPT, and the first electrode DX, second electrode DY, insulating film IL4, bridge DB, and lead line L may be disposed on the second substrate SUB2.

Figure 18:
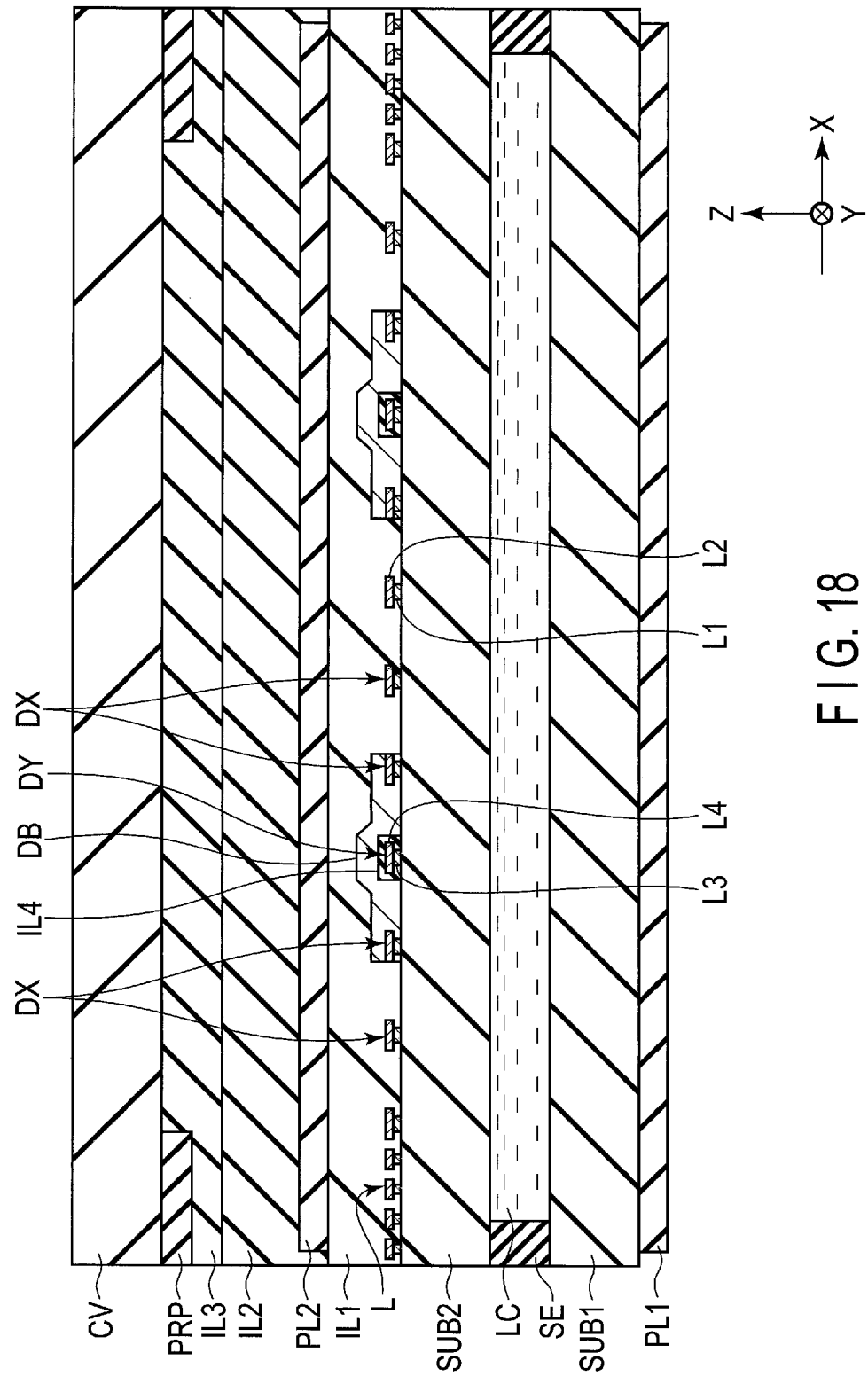
FIG. 18 is a cross-sectional view of a variation of the display device DSP including the sensor device EQ of FIG. 16.

FIG. 18 is a cross-section of the display device DSP in which the sensor device EQ of FIG. 16 is incorporated in the display panel PNL.

In the example depicted, the second substrate SUB2, first electrode DX, insulating film IL4, bridge DB, and lead line L are covered with the insulating film IL1. The second polarizer PL2 is disposed on the insulating film IL1. The first lower surface LS1 contacts the second substrate SUB2. The insulating film IL3 is disposed on the lower surface of the cover CV and the insulating film IL3 covers the peripheral light shielding layer PRP. The insulating film IL2 is disposed between the second polarizer PL2 and the insulating film IL3. In the first electrodes DX which are not covered by a bridge DB, the second upper surface US2 contacts the insulating film IL1. In such a variation, the advantage obtained in the above embodiment can be achieved.

As described above, the present embodiment can present a sensor-equipped display device and a sensor device both of which can suppress degradation in visibility of the display image.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sensor-equipped display device comprising:
   a display panel including a substrate, a sensor drive electrode disposed in a display area and a detection electrode opposed to the sensor drive electrode in the display area; and
   a driver which supplies a sensor drive signal to the sensor drive electrode and reads a change in a detection signal, the sensor drive signal from the sensor drive electrode to be detected as the detection signal by the detection electrode, wherein
   the detection electrode includes a first layer formed in a thin line shape, and a second layer formed on and in contact with the first layer, the second layer having a reflectivity lower than that of the first layer,
   one of the first and second layers is between the substrate and the other of the first and second layers,
   the first layer includes a first lower surface, a first upper surface opposed to the first lower surface and between the first lower surface and the second layer, and a first side surface intersecting with the first lower surface and the first upper surface,
   the second layer includes a second lower surface formed on the first upper surface, and a second upper surface located at an opposite side of the first layer with respect to the second lower surface,
   the first upper surface has a first outer edge and a second outer edge opposed to the first outer edge,
   the second lower surface has a third outer edge and a fourth outer edge opposed to the third outer edge,
   the third outer edge does not overlap the first and second outer edges,
   the fourth outer edge does not overlap the first and second outer edges,
   the first layer has a first outermost outer edge and a second outermost outer edge opposed to the first outermost outer edge,
   the second layer has a third outermost outer edge and a fourth outermost outer edge opposed to the third outermost outer edge,
   the third outermost outer edge is positioned outside the first outermost outer edge and located at an opposite side of the second outermost outer edge with respect to the first outermost outer edge, and
   the fourth outermost outer edge is positioned outside the second outermost outer edge and located at an opposite side of the first outermost outer edge with respect to the second outermost outer edge.

2. The sensor-equipped display device of claim 1, wherein the first lower surface and the first side surface form an angle of 90° or less.

3. The sensor-equipped display device of claim 1, wherein the first lower surface and the first side surface form an obtuse angle.

4. The sensor-equipped display device of claim 1, wherein each of the first layer and the second layer is a conductive layer.

5. The sensor-equipped display device of claim 4, wherein an electrical resistance of the first layer is less than that of the second layer.

6. The sensor-equipped display device of claim 1, wherein the first layer is a multilayer including at least a first thin film and a second thin film, and at least one of the first thin film and the second thin film is a metal film.

7. The sensor-equipped display device of claim 6, wherein the first thin film is a metal film and the second thin film is a transparent conductive film.

8. The sensor-equipped display device of claim 1, wherein the second layer is a reflection suppressive layer which suppresses reflection on the first upper surface.

9. The sensor-equipped display device of claim 8, wherein the second layer is a multilayer including at least two thin films of different refractive indices.

10. The sensor-equipped display device of claim 8, wherein the second layer is a color resin film.

11. The sensor-equipped display device of claim 1, wherein the first lower surface on the display panel.

12. The sensor-equipped display device of claim 1, further comprising an insulating film covering the detection electrode, wherein the second upper surface contacts the insulating film.

13. The sensor-equipped display device of claim 1, further comprising a polarizer over the second layer.

14. A sensor device comprising a substrate and a detection electrode provided with the substrate, wherein
the detection electrode includes a first layer formed in a thin line shape, and a second layer formed on and in contact with the first layer, the second layer having a reflectivity lower than that of the first layer,
one of the first and second layers is between the substrate and an other of the first and second layers,
the first layer includes a first lower surface, a first upper surface opposed to the first lower surface and between the first lower surface and the second layer, and a first side surface intersecting with the first lower surface and the first upper surface,
the second layer includes a second lower surface contacting the first upper surface, and a second upper surface located at an opposite side of the first layer with respect to the second lower surface,
the first upper surface has a first outer edge and a second outer edge opposed to the first outer edge,
the second lower surface has a third outer edge and a fourth outer edge opposed to the third outer edge,
the third outer edge does not overlap the first and second outer edges,
the fourth outer edge does not overlap the first and second outer edges,
the first layer has a first outermost outer edge and a second outermost outer edge opposed to the first outermost outer edge,
the second layer has a third outermost outer edge and a fourth outermost outer edge opposed to the third outermost outer edge,
the third outermost outer edge is positioned outside the first outermost outer edge and located at an opposite side of the second outermost outer edge with respect to the first outermost outer edge, and
the fourth outermost outer edge is positioned outside the second outermost outer edge and located at an opposite side of the first outermost outer edge with respect to the second outermost outer edge.

15. The sensor device of claim 14, wherein the first lower surface and the first side surface form an angle of 90° or less.

16. The sensor device of claim 14, wherein the first lower surface and the first side surface form an obtuse angle.

17. The sensor device of claim 14, wherein the substrate includes a first main surface and a second main surface above the first main surface, and the first lower surface contacts the second main surface.

18. The sensor device of claim 14, wherein the substrate includes a first main surface and a second main surface above the first main surface, and the second upper surface contacts the first main surface.

19. The sensor device of claim 14, further comprising a sensor drive electrode which is positioned in the same layer where the detection electrode is positioned, wherein
the sensor drive electrode includes a third layer which is positioned in the same layer where the first layer is disposed, and a fourth layer above the third layer, and
the third layer is formed of the same material used for the first layer, and the fourth layer is formed of the same material used for the second layer.

20. The sensor drive of claim 14, further comprising an insulating film covering the detection electrode.

* * * * *